US012483150B2

United States Patent
Wu et al.

(10) Patent No.: US 12,483,150 B2
(45) Date of Patent: Nov. 25, 2025

(54) DUAL ACTIVE BRIDGE CONVERTER WITH DEADTIME COMPENSATION REDUCING HEAT FOR VARYING LOADS

(71) Applicant: Deere & Company, Moline, IL (US)

(72) Inventors: Yuheng Wu, Fargo, ND (US); Tianjun Fu, West Fargo, ND (US); Long Wu, Fargo, ND (US); Dustin W. Oelmann, Fargo, ND (US); Richard E. Wainwright, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 222 days.

(21) Appl. No.: 18/360,968

(22) Filed: Jul. 28, 2023

(65) Prior Publication Data

US 2024/0204675 A1 Jun. 20, 2024

Related U.S. Application Data

(60) Provisional application No. 63/387,581, filed on Dec. 15, 2022.

(51) Int. Cl.
*H02M 3/335* (2006.01)
*H02M 1/38* (2007.01)

(52) U.S. Cl.
CPC ......... *H02M 3/33573* (2021.05); *H02M 1/38* (2013.01); *H02M 3/33576* (2013.01)

(58) Field of Classification Search
CPC .............................................. H02M 3/335–42
See application file for complete search history.

(56) References Cited

U.S. PATENT DOCUMENTS

| 2008/0106919 A1* | 5/2008 | Shin ........................ H02M 7/48 363/131 |
| 2015/0349649 A1 | 12/2015 | Zane et al. |
| 2025/0105726 A1* | 3/2025 | Opina, Jr. ............... H02M 1/38 |

OTHER PUBLICATIONS

D. Costinett, R. Zane and D. Maksimovic, "Automatic voltage and dead time control for efficiency optimization in a Dual Active Bridge converter," 2012 Twenty-Seventh Annual IEEE Applied Power Electronics Conference and Exposition (APEC), Orlando, FL, USA, 2012, pp. 1104-1111 (Year: 2012).*
Extended European Search Report and Written Opinion issued in European Patent Application No. 23205340.5 dated May 2, 2024, in 12 pages.
Jim Karki et al., Active Low-Pass Filter Design, Texas Instruments, Jul. 2000, pp. 1-22.
Shuai Shao et al., Modeling and Advanced Control of Dual-Active-Bridge DC-DC Converters: A Review, IEEE Transactions on Power Electronics, vol. 37, No. 2, Feb. 2022, pp. 1524-1547.

(Continued)

*Primary Examiner* — Peter M Novak

(57) ABSTRACT

An electronic controller is configured to provide control signals to the control terminals of the semiconductor switches of the primary converter and the secondary converter based on a commanded current or target output current; the electronic controller is configured to adjust the phase angle(s), between a respective pairs of semiconductor switches of the primary converter and second converter based on a deadtime compensation module responsive to a current error or current difference between the target output current and the observed output current. A low-pass filter facilitates estimation of the current error for compensation in the commanded current.

22 Claims, 14 Drawing Sheets

Deadtime Compensation Module (92)

(56) References Cited

OTHER PUBLICATIONS

Tan-Quoc Duong et al., Sensor-Reduction Control for Dual Active Bridge Converter Under Dual-Phase-Shift Modulation, vol. 10, Jun. 13, 2022, pp. 63020-63033.
J. Hu, Z. Yang and R. W. De Doncker, A Comprehensive Dead-Time Compensation Method for a Three-Phase Dual-Active Bridge Converter with Hybrid Modulation Schemes, 2018 International Power Electronics Conference (IPEC-Niigata 2018—ECCE Asia), 2018, pp. 1073-1079, doi: 10.23919/IPEC.2018.8507775.

* cited by examiner

S309

Within a certain bandwidth, defined by the Q ratio or cutoff frequency, estimating the current error based on the following equation:

$$f_{DT} = C \frac{dU_{DAB}}{dt} + I_{DAB} - I_{cmd}$$

where C is the secondary capacitor between secondary DC output terminals;

$dU_{DAB}/dt$ is the derivative of the estimated output voltage, which measures an alternating current component or transient of predominately direct current output at the secondary DC output terminals;

$I_{DAB}$ is the estimated output current or estimated load current at the secondary DC output terminals;

$I_{cmd}$ is the commanded output current at the secondary DC output terminals.

FIG. 5B

DUAL ACTIVE BRIDGE CONVERTER WITH DEADTIME COMPENSATION REDUCING HEAT FOR VARYING LOADS

RELATED APPLICATION

This document (including the drawings) claims priority and the benefit of the filing date based on U.S. application No. 63/387,581, filed Dec. 15, 2022, under 35 U.S.C. § 119(e), where the provisional application is hereby incorporated by reference herein. This document is also related to EP 23205340.5 that was filed on Oct. 23, 2023 and published on Jun. 19, 2024.

FIELD

This disclosure relates to a dual active bridge (DAB) and a method and system for controlling a direct-current-to-direct-current converter.

BACKGROUND

In some prior art, a direct-current-to-direct-current converter is used to interface with or to convert direct (DC) bus voltages between a first voltage level and a second voltage level of DC voltage. For example, a primary converter is coupled to a secondary converter via a transformer, where the primary converter is associated with an energy storage device at the first voltage level and where the secondary converter is associated with a load at a second voltage level. The efficiency and heat dissipation of the converter may vary with changes in the load, which tends to require the design of elaborate cooling systems. Accordingly, there is need for method and system for controlling a direct-current to a direct-current converter that generates less thermal energy by adjusting a modulation frequency (e.g., pulse-width modulation frequency) of the primary converter and secondary converter associated with a corresponding load.

SUMMARY

In accordance with one aspect of the disclosure, a dual-active-bridge converter comprises a primary converter, a secondary converter, a transformer, and an electronic controller. A primary converter has a first switched terminal of low-side semiconductor switch that is coupled to a corresponding second switched terminal of high-side semiconductor switch at a primary alternating current node. The low-side semiconductor switch has a second switched terminal that is coupled to one terminal of a primary direct current bus; the high-side semiconductor switch has a first switched terminal coupled to another terminal of the primary direct current bus.

A secondary converter has a first switched terminal of low-side semiconductor switch that is coupled to a corresponding second switched terminal of high-side semiconductor switch at an secondary alternating current node. The low-side semiconductor switch has a second switched terminal that is coupled to one terminal of a secondary direct current bus; the high-side semiconductor switch has a first switched terminal coupled to another terminal of the secondary direct current bus.

An output voltage sensor configured to measure an observed output voltage of the secondary converter; an output current sensor is configured to measure an observed output current of the secondary converter. A transformer is coupled between the primary alternating current node and the secondary alternating current node.

An electronic controller is configured to provide control signals to the control terminals of the semiconductor switches of the primary converter and the secondary converter based on a commanded current or target output current; the electronic controller is configured to adjust the phase angle(s) (e.g., compensating phase shift, $\phi$), between a respective pairs of semiconductor switches (e.g., pairs of low-side semiconductor switches, or pairs of high-side semiconductor switches, or both) of the primary converter and second converter based on a deadtime compensation module responsive to a current error or current difference between the target output current and the observed output current.

In accordance with another aspect, a low-pass filter facilitates estimation of the current error for compensation in the commanded current.

BRIEF DESCRIPTION OF THE DRAWINGS

Like reference numbers in any two drawings indicate like features, elements, steps and/or procedures.

DESCRIPTION OF THE PREFERRED EMBODIMENTS

In any of the above referenced drawings of this document, any arrow or line that connects any blocks, components, modules, multiplexers, sensors, switches, diodes, memory, data storage, data processors, electronic components, oscillators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system and method disclosed in this document may comprise a computer-implemented system, method or converter in which one or more data processors process, store, retrieve, and otherwise manipulate data via data buses and one or more data storage devices (e.g., data storage device or memory) as described in this document and the accompanying drawings. As used in this document, "configured to, adapted to, or arranged to" mean that the data processor, converter or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the converter comprises one or more components described herein as software modules, equivalent electronic hardware modules, or both to execute any referenced functions, logic operations, mathematical operations, calculations, determinations, processes, methods, algorithms, subroutine.

Figure 1A:
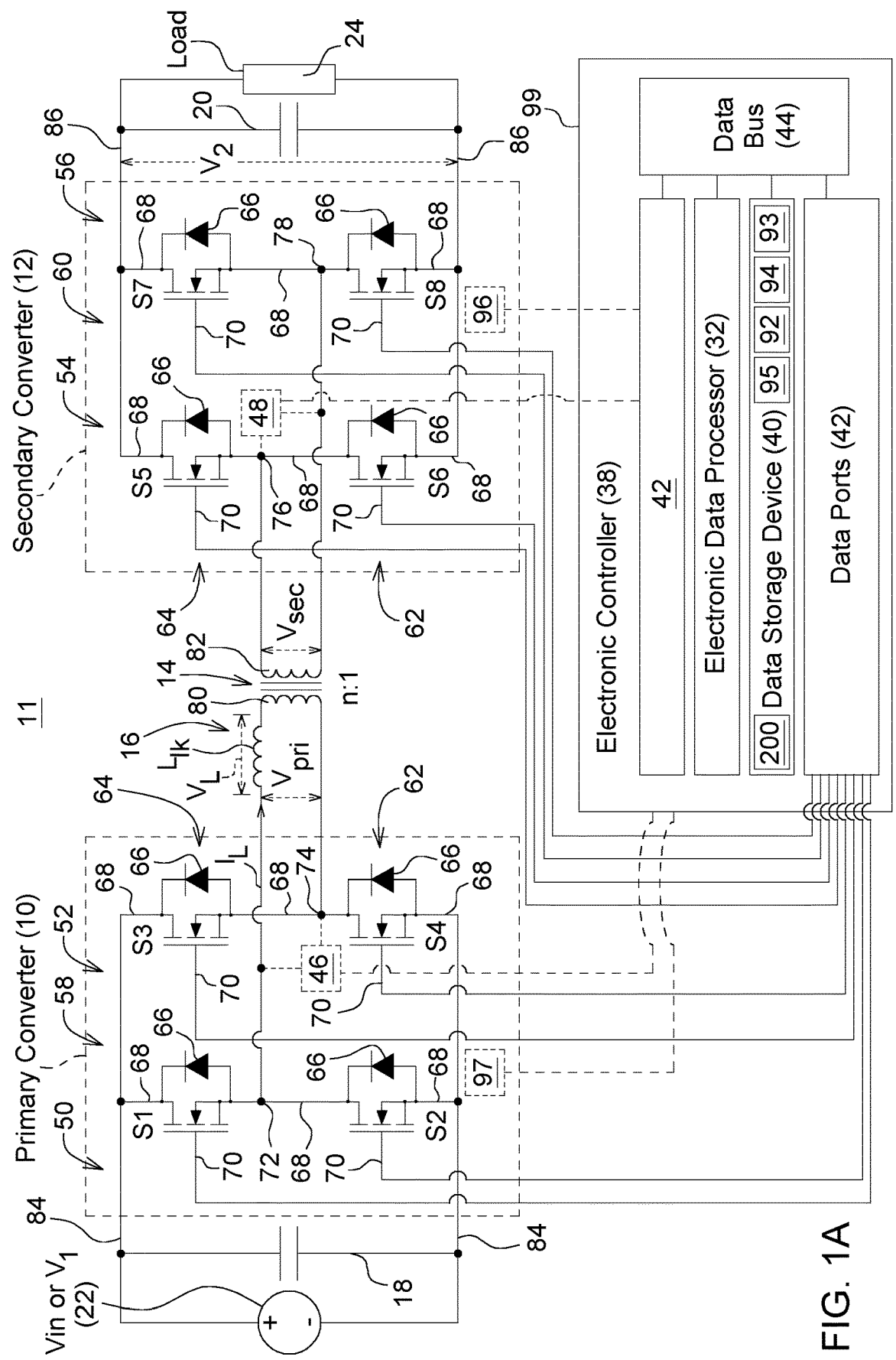
FIG. 1A is a schematic diagram of one embodiment of a direct-current-to-direct-current converter that comprises a primary full bridge converter coupled to a secondary full bridge converter via a transformer.

In accordance with one embodiment, FIG. 1A illustrates a system of controlling a direct-current (DC) to direct-current (DC) converter for improved thermal efficiency. In FIG. 1A, a primary converter 10 comprises first pair 50 of primary switches and a second pair 52 of primary switches coupled between direct current input terminals 84 of the primary converter 10. A secondary converter 12 comprises a first pair 54 of secondary switches and second pair 56 of secondary switches coupled between direct current (output) terminals 86 of the secondary converter. The first pair 54 of secondary switches may also be referred to as a third pair of semiconductor switches (S5, S6) within the DC-to-DC converter 11; similarly the second pair 56 of secondary switches may be referred to as a fourth pair of semiconductor switches (S7, S8) within the DC-to-DC converter 11. The transformer 14 (e.g., isolation transformer) is coupled between the primary converter 10 and the secondary converter 12. A primary winding 80 of the transformer 14 is coupled to output terminals of the first pair 50 and second pair 52 of primary switches and a secondary winding 82 of the transformer 14 is coupled to output terminals of the secondary switches 60. A load 24 (e.g., direct-current load) is arranged for coupling to the direct current output terminals 86; wherein an electronic controller 38 is configured to provide time-synchronized control signals to the control terminals of the primary switches 58 and secondary switches 60 to control the converter 11 or system to operate at a modulation frequency (e.g., pulse width modulation frequency).

In one embodiment, one or more voltage measurement devices (46, 48) are configured to measure an observed input voltage and observed output voltage to determine an operational load ratio or operational load percentage between the observed power transfer and maximum power transfer. Because the measurement devices (46, 48) are optional in some configurations, the measurement devices are illustrated in dashed lines.

In one configuration, an electronic data processor 32 or electronic controller 38 is configured to select a load curve based on the determined operational load ratio or percentage. Further, the electronic data processor 32 or electronic controller 38 is configured to adjust or maintain the modulation frequency (e.g., pulse width modulation (PWM)) of the primary converter 10 and the secondary converter 12 consistent with an operation point on the selected load curve, where the operation point minimizes the power loss or thermal energy dissipated from the direct-current-to-direct current converter 11. In some embodiments, a load curve may show any of the following: load current versus fundamental switching frequency, or load current versus efficiency (e.g., percentage efficiency), based on the technical characteristics (e.g., transformer maximum power specifications or transformer size limitations, capacitance of output capacitor or capacitor size limitations, maximum switching frequency, and switching losses) of the DC-DC converter and the percentage of maximum load.

FIG. 1A is a schematic diagram of one embodiment of a direct-current-to-direct-current converter 11 (DC-to-DC converter) that comprises a primary full bridge 10 coupled to a secondary full bridge 12 via a transformer 14. A primary full bridge 10 comprises first pair 50 of primary switches and a second pair 52 of primary switches. The first pair 50 of primary switches is coupled between direct current (DC) primary terminals 84 (e.g., input terminals) of the primary full bridge 10; the second pair 52 of primary switches 58 is coupled between DC primary terminals 84 (e.g., input terminals) of the primary full bridge 10. The first pair 52 and second pair 58 of primary switches may be referred to as an H-bridge.

In one embodiment, the DC-to-DC converter 11 comprises a single phase, dual-active bridge DC-to-DC converter with DC primary terminals 84 (e.g., DC input terminals) at the primary full bridge 10 and DC secondary terminals 86 (e.g., DC output terminals) at the secondary full bridge 12, where the DC-to-DC converter may operate unidirectionally or bidirectionally (e.g., to transfer electrical power or energy from the input to the output of the converter 11, or vice versa).

Each pair of primary switches 58 comprises a low-side switch 62 and a high-side switch 64. Similarly, each pair of secondary switches 60 comprises a low-side switch 62 and a high-side switch 64. Each switch (58, 60) has switched terminals 68 that are controlled by a control terminal 70. For example, if the switch is a field effect transistor, such as a metal oxide semiconductor field effect transistor (MOSFET) (e.g., Silicon Carbide MOSFET), the switched terminals 68 comprise a source and drain terminal and the control terminal 70 comprises a gate terminal. In one configuration, for each pair of primary switches 58, the switched terminals 68 of the low-side switch 62 are coupled in series to the switched terminals 68 of the high-side switch 64 between the DC primary terminals 84. As illustrated in FIG. 1A, each switch has a protective diode 66 coupled in parallel to the switched terminals 68 of the respective switch. In one embodiment, the switches (58, 60) may comprise silicon carbide field effect transistors or other wide-band-gap semiconductor devices.

In the primary full bridge 10, the switched terminals 68 of the first pair 50 of low-side switch 62 and the high-side switch 64 are coupled together at a first node 72 or first junction associated with a primary alternating current signal. In the primary full bridge 10, the switched terminals 68 of the second pair 52 of low-side switch 62 and the high-side switch 64 are coupled together at a second node 74 or second junction associated with the primary alternating current signal.

A secondary full bridge 12 comprises a third pair of switches (e.g., S5, S6, secondary switches 60) and a fourth pair of switches (e.g., S7, S8, secondary switches 60) coupled between DC secondary terminals 86 (e.g., output terminals) of the secondary full bridge 12. The third pair of switches (e.g., S5, S6, secondary switches 60) is coupled between direct current secondary terminals (e.g., output terminals) of the secondary full bridge 12; the fourth pair of switches (e.g., S7, S8, secondary switches 60) is coupled between DC secondary terminals 86 (e.g., output terminals) of the secondary full bridge 12.

Each pair of secondary switches 60 comprises a low-side switch 62 and a high side switch 64. Each secondary switch 60 has switched terminals 68 that are controlled by a control terminal 70. For example, if the switch is a field effect transistor, such as a metal oxide semiconductor field effect transistor (MOSFET) (e.g., silicon carbide MOSFET devices), the switched terminals 68 comprise a source and drain terminal and the control terminal 70 comprises a gate terminal. As illustrated in FIG. 1A, each secondary switch 60 has a protective diode 66 coupled in parallel to the switched terminals 68 of the respective switch.

In the DC-to-DC converter 11 in one illustrative configuration, each diode 66 facilitates current dissipation associated with the respective switch (58, 60), to which the diode 66 is coupled in parallel, to reduce transient voltages across the switch (e.g., during a prior turn-off, prior deactivation or prior dead-time of the switch in preparation) for the next turning on of the switch, or next activating of the switch (58, 60). In one embodiment, the protective diodes 66 may be composed gallium nitride diodes or other semiconductor materials.

In the secondary full bridge 12, the switched terminals 68 of the third pair (S5, S6) of low-side switch 62 and the high-side switch 64 are coupled together at a third node 76 or third junction associated with a secondary alternating current signal. In the secondary full bridge 12, the switched terminals 68 of the fourth pair 56 of low-side switch 62 and the high-side switch 64 are coupled together at a fourth node 78 or fourth junction associated with the secondary alternating current signal.

In one embodiment, a transformer 14 is coupled between the primary full bridge 10 and the secondary full bridge 12. For example, a primary winding 80 of the transformer 14 is coupled to a first node 72 (e.g., first output terminal) of the first pair 50 and the second node 74 (e.g., second output terminal) of second pair 52 of primary switches 58. Similarly, a secondary winding 82 of the transformer 14 is coupled to a third node 76 (e.g., third output terminal) of the third pair (S5, S6) and a fourth node 78 (e.g., fourth output terminal) of the fourth pair 56 of switches (e.g., secondary switches 60).

The transformer 14 has at least one primary winding 80 and at least one secondary winding 82, where a transformer 14 ratio (n) represents a voltage ratio between the primary terminals and the secondary terminals, or between the primary winding and the secondary winding. For example, the primary winding 80 ratio may represent the number of relative turns (n) of the primary winding 80 to the secondary winding 82. The voltage ratio or winding ratio (turn ratio) may depend upon the winding configuration, the conductor configuration, and the configuration of any core, such as ferromagnetic core, a ferrite core, or an iron core.

In one embodiment, an inductor or variable inductor 16 is coupled in series with the primary winding 80 of the transformer. In an alternate embodiment, the variable inductor is associated with a set of discrete inductors that can be connected, via a set of switches, in series, in a parallel, or both, to achieve an adjustable aggregate inductance. For example, the controller 38 or data processor 32 can control or adjust the variable inductor, or its associated switches, to tune the transformer 14 for the target modulation frequency (e.g., of a pulse width modulation (PWM) signal) to minimize power loss, power difference or thermal dissipation of the converter 11.

An energy source 22 (e.g., battery, capacitor, or generator output) is coupled to the direct current (DC) primary terminals 84 (e.g., input terminals). A load 24 (e.g., active or passive load) is configured to be coupled to the direct current (DC) secondary terminals 86 (e.g., output terminals). However, the DC-to-DC converter 11 that comprises the primary full bridge 10, the secondary full bridge 12 and the transformer 14 can operate bi-directionally, such as where the electrical energy is transferred in either direction between the DC primary terminals 84 and the DC secondary terminals 86. In one direction, the energy source 22 at the DC primary terminals 84 can power a load 24 at the DC secondary terminals 86. However, in the opposite direction, the load 24 at the DC secondary terminals 86 can provide excess or transient energy to the DC primary terminals 84 to charge the energy source 22. As illustrated, a capacitor, such as a primary capacitor 18 is placed across the DC primary terminals 84 and a secondary capacitor 20 is placed across the DC secondary terminals 86, where the primary capacitor 18 and the secondary capacitor 20 are used for filtering (e.g., to reduce noise, such as voltage ripple in the DC voltage).

In certain embodiments, the DC primary terminals 84 are configured to operate at a different voltage level than the DC secondary terminals 86. In other embodiments, the DC primary terminals 84, the DC secondary voltage levels can have variable voltage levels that can fluctuate with the load 24 or operating conditions on a dynamic basis for each time interval (e.g., sampling time of DC voltage observed at the DC primary input and DC secondary output terminals of the converter). For example, the DC primary terminals 84 operate at a higher voltage level or higher voltage range (e.g., approximately 400 VDC to approximately 800 VDC) than a lower voltage level or lower voltage range (e.g., approximately 12 VDC to approximately 400 VDC) the DC secondary terminals 86. Accordingly, the electronic assembly or DC-to-DC converter 11 supports a vehicle with different DC bus levels that are isolated from each other because the transformer blocks DC energy from passing through between transformer primary and transformer secondary.

In one embodiment, an electronic data processor 32, such as an electronic controller 38, is configured to provide time-synchronized control signals to the control terminals 70 of the primary switches 58 and secondary switches 60 to control the converter 11 to operate efficiently in a first control mode 26, a second control mode 28, or a third control mode 30 (in FIG. 7), wherein the first control mode 26 comprises a phase-shift mode, the second control mode 28 comprises a triangular waveform control mode and wherein the third control mode 30 comprises a trapezoidal waveform control mode.

In one embodiment, an electronic controller 38 comprises an electronic data processor 32, a data storage device 40, and one or more data ports 42 coupled to or in communication with a data bus 44. The electronic data processor 32, the data storage device 40, and one or more data ports 42 may communicate data messages between each other via the data bus 44.

The electronic data processor 32 comprises a microcontroller, a microprocessor, a programmable logic array, a logic device, an arithmetic logic unit, a digital signal processor, an application specific integrated circuit or another device for processing or manipulating data. The data storage device 40 comprises electronic memory, nonvolatile random-access memory, magnetic storage device, an optical storage device, or another device for storing, retrieving and managing data, files, data structures or data records. The data ports 42 may comprise an input/output port, a data transceiver, a wireline transceiver, a wireless transceiver, buffer memory, or a combination of the foregoing items.

In one embodiment, the electronic data processor 32 or its data ports 42 are connected to or in communication with the control terminals 70 of the switches (e.g., primary switches 58 and the secondary switches 60) of the primary full bridge 10 and the secondary full bridge 12. Accordingly, the electronic controller 38 can control the timing and operation of each switch, such as activation time, deactivation time, biasing and other aspects. In one embodiment, the electronic controller 38 or electronic data processor 32 uses a fixed switching frequency of fundamental frequency (e.g., within an operational range of switching frequencies) of the switches for multiple or all modulation modes, such as the first mode, the second mode and the third mode. Further, the switches can operate with a same or substantially similar fixed duty cycle (e.g., 50 percent duty cycle plus or minus ten percent tolerance) for multiple or all modulation modes, such as the first mode, the second mode and the third mode. In some configurations, the peak magnitude and duration of the gate signal of the high-side switch 64 and low-side switch 62 of any pair, phase, half-bridge, or full-bridge will generally be equal or substantially equivalent.

Although the DC primary terminals 84 (e.g., DC primary bus) and the DC secondary terminals 86 (e.g., DC secondary bus) have fixed voltage levels, the primary voltage (V1) at (or across) the transformer primary winding 80, or the secondary voltage (V2) at (or across) the transformer secondary winding 82, or both can vary.

In one embodiment, a first voltage sensor 46 (e.g., primary voltage sensor) is configured to measure the primary voltage (e.g., root-mean-squared voltage, peak voltage or other alternating current voltage measurement) and a second voltage sensor 48 (e.g., secondary voltage sensor) is configured to: (a) measure the observed primary and secondary voltages (e.g., root-mean-squared voltage, peak voltage or other alternating current voltage measurement) and (b) provide the measurements observed voltage readings of the primary voltage and secondary voltage (e.g., at the transformer terminals of the primary winding and secondary winding) to the electronic controller 38 via one or more data ports 42. In another embodiment, the first voltage sensor 46 and the second voltage sensor 48 may measure one or more of the following: alternating current (AC) voltage levels, root-mean-squared (RMS) voltage levels, or rectified alternating current (e.g., via a half-wave or full-wave bridge rectifier) at one or more transformer windings (80, 82). Further, the electronic controller 38 or electronic data processor 32 is configured to estimate the DC primary voltage at the DC primary (input) terminals 84 and the DC secondary voltage at the DC secondary (output) terminals 86 of the converter 11 based on the measurements, or can control the switches in an initialization mode or test mode to facilitate direct measurement of the primary voltage at the DC primary (input) terminals 84 and the secondary voltage at the DC secondary (output) terminals 86 of the converter.

Alternately, (e.g., during initialization mode or operational mode) the first voltage sensor 146 (in FIG. 1B) and the second voltage sensor 148 (in FIG. 1B) are configured to: (a) measure the primary voltage at the DC primary (input) terminals 84 and the secondary voltage at the DC secondary (output) terminals 86 of the converter 11, and (b) provide the measurements to the electronic controller 38 via one or more data ports 42. Accordingly, the observed primary voltage and the observed secondary voltage can be or are applied to one or more transferred power equations that apply to the respective control mode to estimate the maximum transferred power for each control mod, among other things.

Figure 1B:
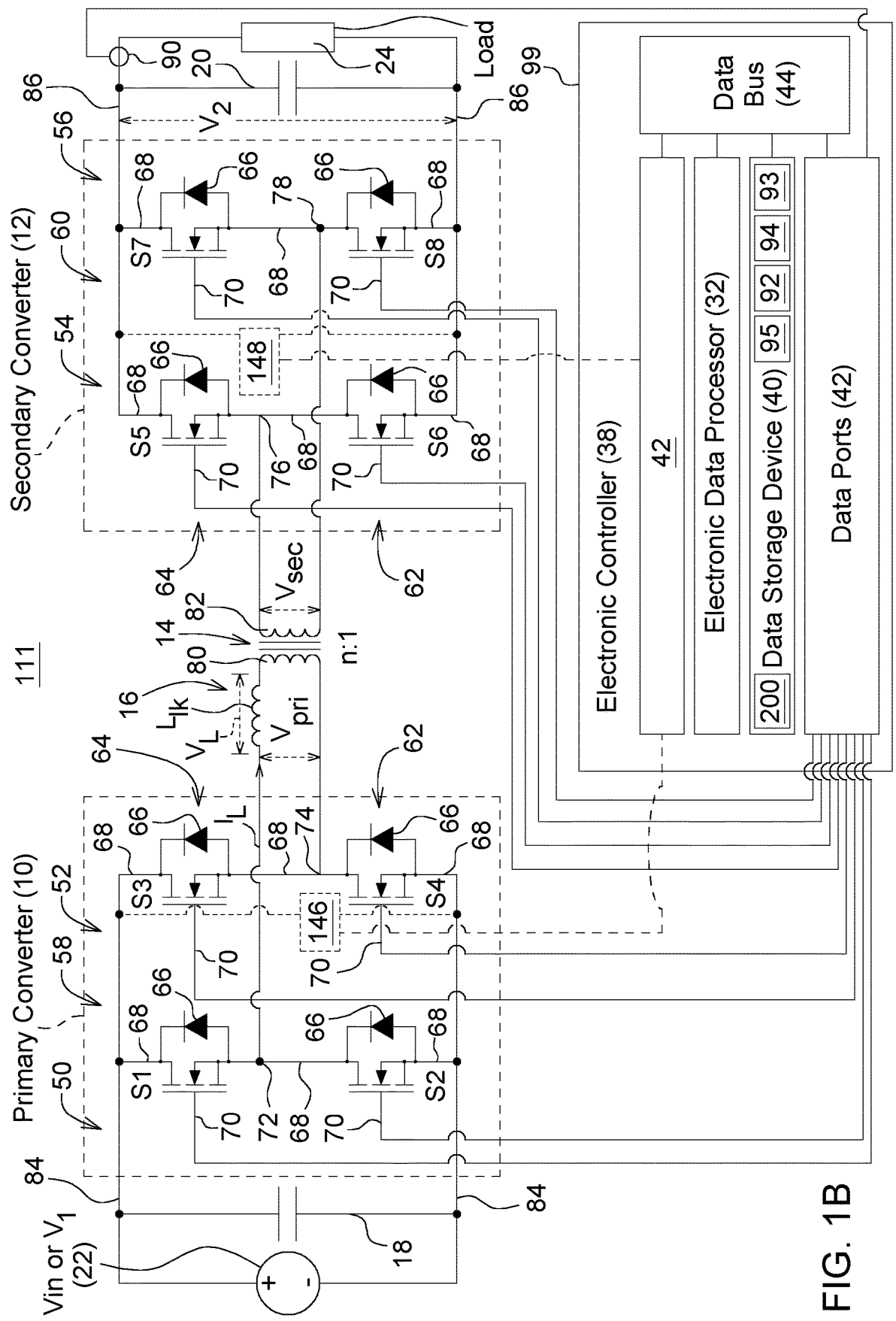
FIG. 1B is a schematic diagram of another embodiment of a direct-current-to-direct-current converter that comprises a primary full bridge converter coupled to a secondary full bridge converter via a transformer.
Figure 4:
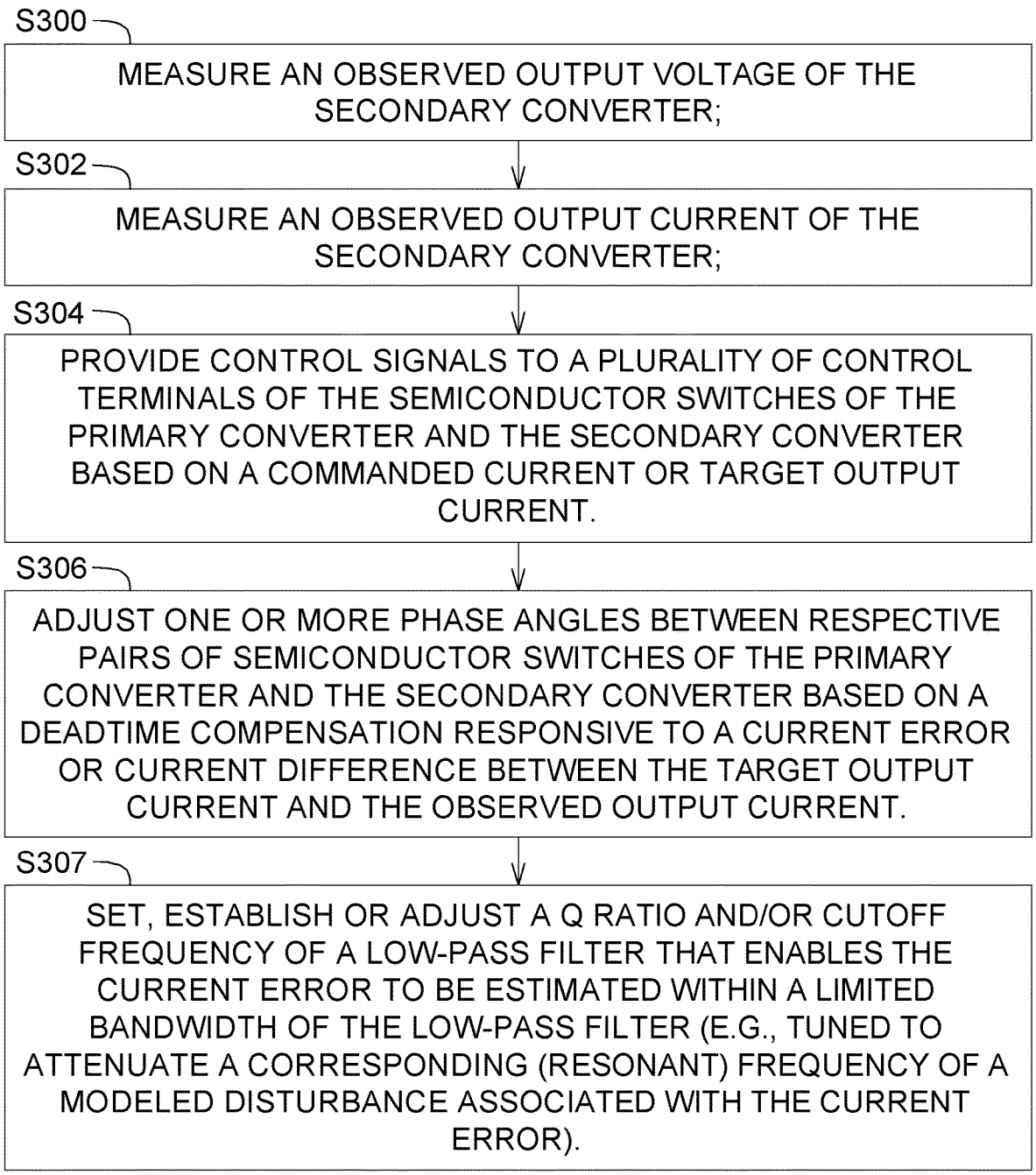
FIG. 4 is a flow chart of second embodiment of a method for controlling a direct-current-to-direct-current-converter based on deadtime compensation.

FIG. 1B is similar to FIG. 1A, except the first voltage sensor 46 and the second voltage sensor 48 of FIG. 1A are replaced by the first voltage sensor 146 and the second voltage sensor 148 of FIG. 1B. For example, the readings by a first voltage sensor 146 and a second voltage sensor 148 can be applied to the equations set forth in this document that call for the DC primary voltage (V1 or Vi) at terminals 84 or DC secondary voltage (V2 or Vout) at terminals 86, where Vin and Vout are illustrated in FIG. 4. In an alternate embodiment, the first voltage sensor 146 or the second voltage sensor 148 may be omitted if the DC primary voltage (V1) is fixed or regulated within a certain tolerance and the second voltage sensor 148 may be omitted if the DC secondary voltage (V2) is fixed or regulated within a certain tolerance (e.g., in accordance with design-specifications).

In accordance with one aspect of the disclosure, a dual-active-bridge converter 11 comprises a primary converter 10, a secondary converter 12, a transformer 14, and an electronic controller 38. A primary converter 10 has a first switched terminal (68) of low-side semiconductor switch (S2, S4) that is coupled to a corresponding second switched terminal (68) of high-side semiconductor switch (S1, S3) at a primary alternating current node (72, 74). The low-side semiconductor switch (S2, S4) has a second switched terminal (68) that is coupled to one terminal of a primary direct current bus 84; the high-side semiconductor switch (S1, S3) has a first switched terminal (68) coupled to another terminal of the primary direct current bus 84.

A secondary converter 12 has a first switched terminal (68) of low-side semiconductor switch (S6, S8) that is coupled to a corresponding second switched terminal (68) of high-side semiconductor switch (S5, S7) at an secondary alternating current node (76, 78). The low-side semiconductor switch (S6, S8) has a second switched terminal (68) that is coupled to one terminal of a secondary direct current bus 86; the high-side semiconductor switch (S5, S7) has a first switched terminal (68) coupled to another terminal 86 of the secondary direct current bus.

An output voltage sensor (48, 148) configured to measure (or estimate) an observed output voltage of the secondary converter (48, 148); an output current sensor (90) is configured to measure (or estimate) an observed output current of the secondary converter. For example, an output current sensor (90) may be configured as an inductively coupled current sensor that senses the current flowing though the conductor or cable associated with the load 24. Alternately, the output current sensor 90 may derive the current by a current sensing resistor placed in series with the load 24 to provide a voltage that is proportional to the load current or output current.

A transformer 14 is coupled between the primary current node(s) (72, 74) and the secondary current node(s) (76, 78).

An electronic controller 38 is configured to provide control signals to the control terminals 70 of the semiconductor switches (S1, S2, S2, S4) of the primary converter 10 and to the control terminals 70 of the semiconductor switches (25, S6, S7, S8) of the secondary converter 12 based on a commanded current ($I_{cmd}$) or target output current; the electronic controller 38 is configured to adjust the phase angle(s), between a respective pairs of semiconductor switches (e.g., pairs of low-side semiconductor switches, or pairs of high-side semiconductor switches, or both) of the primary converter 10 and second converter 12 based on a deadtime compensation module 92 responsive to a current error or current difference between the target output current and the observed output current. Respective of pairs of semiconductor switches may include the following pairs: S1 and S5; S2 and S6; S3 and S7; S4 and S8, for example.

The data storage device 40 of the electronic controller 38 may store software instructions or software modules that are executable by the electronic data processor 32, such as software instructions or software modules like the deadtime compensation module 92, the temperature estimation module 93, electrical properties sensing module 94, and commanded current correction module 95.

The temperature estimation module 93 may use one or more temperature sensors (96,97) to estimate the operational temperature versus time of the primary converter 10, the secondary converter 12, or components of the primary converter 10, and the secondary converter 12, such as the semiconductor switches (S1, S2, S3, S4, S5, S6, S7, S8).

The electrical properties sensing module 94 is configured to measure, determine or estimate one or more of the following electrical properties: (a) the output current of the secondary converter 12 or output load current via current sensor 90; the output current of the primary converter 10 to energy source 22 (e.g., battery or ultra-capacitor) via a current sensor (e.g., similar to current sensor 90 on the secondary converter); (c) the capacitor current (e.g., of the secondary capacitor 20 or primary capacitor 18); (d) alternating current ripple or alternating current components on the primary or secondary DC bus, via sensors (146, 148); and (e) DC voltage on the primary or secondary bus via sensors (146, 148) coupled to the data ports 42.

In any some embodiments, the current sensors (90), and voltage sensors (46, 48, 146, 148), and temperature sensors (96, 97) may be used alone or together with analog-to-digital converters to provide digital voltage output to the data ports 42.

The deadtime compensation module 92, controller or electronic data processor is configured to adjust one or more phase angles between respective pairs of semiconductor switches of the primary converter and the secondary converter based on a on deadtime compensation (e.g., compensating phase offset angle ($\phi$)) responsive to a current error or current differences between the target output current and the observed output current. Further, alone or together with the compensating phase offset, the commanded current correction module 95, controller or electronic data process is configured to provide a current correction to the commanded current to compensate for the current error, such as current error components associated with current measurement error and/or measurement noise.

Figure 2:
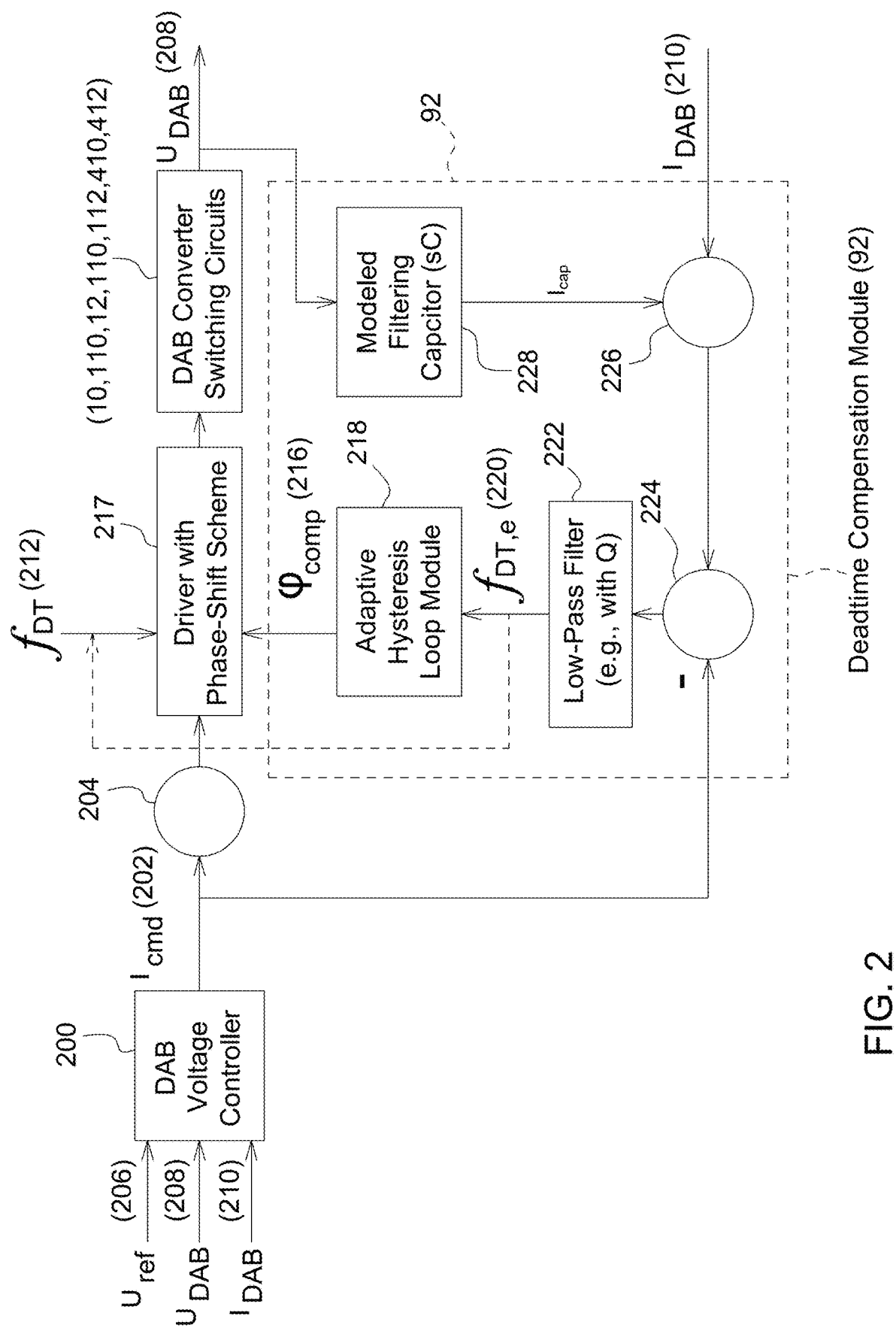
FIG. 2 shows one possible embodiment of a block diagram of a deadtime compensation module that can be used in conjunction with any embodiments of the direct-to-direct converter disclosed in this document.

FIG. 2 illustrates a block diagram for controlling an DC-to-DC converter (11, 111, 211) with deadtime compensation via a deadtime compensation module 92, along with other components.

The DC-to-DC converter (11, 111, 211) comprises a voltage controller 200 that is configured to generate commanded current 202 ($I_{cmd}$) in response to one or more of the following inputs: (a) a reference voltage 206 (Uref), (b) is the observed voltage 208 ($U_{DAB}$) across the terminals of the secondary capacitor 20, and (c) observed output current 210 ($I_{DAB}$) or observed load current (e.g., through the load) at the secondary DC (output) terminals (e.g., 86). The voltage controller 200 is coupled to a first summer 204 and a second summer 224.

The first summer 204 is configured to provide an accumulator, a shift register, an integrator or delay block of the commanded current, For example, in one embodiment, the first summer 204 is configured to average or smooth the commanded current at the output of the first summer 204, for example.

The first summer 204 is coupled to a driver 217 (e.g., driver with phase-shift scheme module) that is associated with a driver for providing control signals to the control terminals (70) (e.g., gates or bases) of the switches of the primary converter (10, 110) and the secondary converter (12,112) that are offset by a compensating angle or compensating phase shift offset angle for a corresponding phase of low-side switches 62 in the primary converter (10, 110) and the secondary converter (12,120) and a corresponding phase of high-side switches 64 in the primary converter (10, 110) and the secondary converter (12, 112).

The driver 217 (e.g., gate or driver of the switches in the DC-to-DC converter) may comprise a driver with phase-shift scheme module; the driver 217 is coupled to the control terminals 70 of the primary converter (10, 110) and the secondary converter (12, 112) to output the observed voltage ($U_{DAB}$) across the terminals of the secondary capacitor 20, which is modeled as a Laplace frequency domain expression of sC, in which the capacitor current is expressed as $sCU_{DAB}$.

A third summer 226 is configured to sum the capacitor current of the secondary capacitor (20) and the observed output current or observed load current ($I_{DAB}$), which are provided as an inputs to the third summer 226. The third summer 226 provides the summed currents to the second summer 224.

The second summer 224 sums the negative commanded current (−Icmd) from the voltage controller 200 with the summed currents of the second summer 224. The sum of the observed load current ($I_{DAB}$), the capacitor current ($I_c$) of the secondary capacitor and the negative commanded current (−Icmd) are provided by the second summer 224 to the low-pass filter 222. The output of the second summer 224 is coupled to the low-pass filter 222.

The low-pass filter 222 reduces or ameliorates the current error in the electrical current observations or summed currents based on measurements by attenuating the noise error or alternating current noise significantly above the cut-off frequency of the low-pass filter. The bandwidth or cut-off frequency of the low-pass filter 222 is inversely proportional to the Q or quality ratio, which can be selected to align the filter bandwidth or cut-off frequency to attenuate the disturbance associated with the deadtime. In accordance with one embodiment, a low-pass filter 222 has a dynamically or adaptively tunable bandwidth, tunable bandpass cut-off frequency or tunable quality factor, Q that is aligned or adjusted to attenuate a disturbance or transient state, such as: (a) load current feedforward command, or (b) a deadtime effect (e.g., open-loop estimation of deadtime disturbance or deadtime transient), or both to facilitate estimation of the current error for compensation in the commanded current. For example, if one of two parallel dual active bridge DC-to-DC converters are operating in a feedforward mode with load current feedforward enabled, the parallel converters can be susceptible to fluctuation, deviation or oscillation of the power output (e.g., current output) of the converter. Further, one or more DC-DC converters can be susceptible to transient fluctuation, deviation or oscillation of the power output (e.g., current output) of the converter during switching modes between enabling the feedforward mode and disabling the feedforward mode.

In one embodiment, the low-pass filter 222 may be realized by digital circuits comprising a finite impulse response, infinite impulse response or hybrid filter, separately or integral with the electronic data processor 32, such as field programmable gate array or system on a chip or system on a module. For example, the finite impulse response, infinite impulse response or hybrid filter has a dynamically or adaptively tunable bandwidth, tunable bandpass cut-off frequency or tunable quality factor, Q, by adjusting one or more filter coefficients, amplifier gains (if present), the delay units (e.g., by accessing different registers or taps of the filter via semiconductor switches or switching networks). Further, the low-pass filter 222 may be configured as a separate discrete digital or analog low-pass filter that interfaces the electronic controller 38 via data ports 42, directly or via suitable analog-to-digital converters with sufficient bandwidths and oversampling capability.

In an alternate embodiment, the low-pass filter 222 may be replaced or substituted as a low-pass filter or other types of filters, with low-pass characteristics, bandpass characteristics or notch filter characteristics.

As illustrated in FIG. 2, the low-pass filter 222 is coupled to the adaptive hysteresis loop module 218, to the change or update to the compensating phase shift (e.g., from the low-pass filter 222) or deadtime compensating phase shift over one or more sampling intervals. The hysteresis loop module 218 may bound or limit the maximum compensating phase shift and the minimum compensating phase shift based on one or more of the following parameters: (a) the fundamental switching frequency or pulse width modulation frequency; (b) the deadtime duration of one or more primary switches of the primary converter, (c) the deadtime duration of one or more secondary switches of the secondary converter, and (d) maintenance of zero voltage switching (ZVS) mode for one or more semiconductor switches of the primary converter (10, 110), while one or more the semiconductor switches of the secondary converter (12, 112) are not within a zero voltage switching (ZVS) mode (e.g., an efficient switching mode); (e) maintenance of zero voltage switching (ZVS) mode in one or more switches of secondary converter (12, 112), while one or more semiconductor switches of the primary converter is not within a zero voltage switching (ZVS) mode. The compensating phase shift angle is not constant over the entire operating region of the DC-to-DC converter. Rather, in one embodiment the deadtime compensation module 92, alone or together with the hysteresis loop module 218, is configured to use the ZVS behavior and the operating point of the DC-to-DC converter in conjunction with load curves to estimate the compensating phase shift angle.

Separately or cumulatively, with bounding or limiting the compensating phase shift, the hysteresis loop module 218 can also bound or limit the current error by observed measurements. The adaptive hysteresis loop module 218 provides an output of the compensating deadtime phase shift angle ($\phi$) 216 to the driver 217 to provide to the control terminals of the respective semiconductor switches (e.g., ones of the aligned pairs of semiconductor switches in the primary converters and secondary converter).

In an alternate embodiment, the adaptive hysteresis loop module 218 can be disabled, enabled or temporarily enabled or disabled for one or more sampling intervals of the current measurements or other electrical measurements. Further, in an alternate embodiment, the hysteresis loop module 218 may be bypassed, such that the low-pass filter 222 can provide a compensating phase shift angle for deadtime compensation and/or corresponding current error (e.g., filtered or time-averaged current error for 212 or observed current error $f_{DT,e}$ 220) directly to the driver 217 (e.g., driver with phase shift scheme module).

In one embodiment in accordance with FIG. 2, the electronic controller 38 or electronic data processor 32 is configured to determine a current error 212 ($f_{DT}$), where the current error 212 is a function of a low-pass filter bandwidth, or a quality Q ratio of the filter, or its cut-off frequency, that enables the current error to be estimated within a limited bandwidth of the low-pass filter (e.g., tuned to, or about, a corresponding resonant frequency of a modeled disturbance associated with the current error). Here, in one example, "about" a corresponding resonant frequency may refer to plus or minus ten percent of the resonant frequency or the entire half-power passband of the low-pass filter. The low-pass filter 222 may be defined by a magnitude decrease of negative 3 decibel (dB) or half-power bandwidth from peak magnitude, in the magnitude versus frequency response of the filter.

In some configurations, the Q ratio represents the quality or selectivity (e.g., steepness or roll-off) of the magnitude versus frequency response of the filter over the passband or sub-band of the passband of the low-pass filter, whereas the cut-off frequency for the low-pass filter is the frequency (e.g., highest frequency) at the edge of the passband of the filter at which attenuation materially increases, which is typically measured as the point where the filter attenuates by negative 3 decibels (dB). For example, a properly tuned second order or third order filter generally has a higher Q ratio than a first order filter over the passband or bandwidth of interest. For some active second order filters that can be realized by an operational amplifier and two parallel resistor capacitor networks. The second order low-pass filter or quasi-low-pass filter can have a greater quality factor, Q, than a single order low-pass filter; which can be observed by the slope(s) around or above the cut-off frequency or roll-off frequency or knee of the magnitude versus frequency response.

In FIG. 2, the deadtime compensation module 92 is consistent with the following equation:

$$f_{DT,e} = Q(sCU_{DAB} + I_{DAB} - I_{cmd}),$$

where $f_{DT,e}$ is the current error plus noise error (e.g., at high frequencies) between the ideal output current and the actual output current that is influenced or disturbed by deadtime;

where secondary capacitor, C, 20 has a capacitance (e.g., in Farads) between secondary DC output terminals 86 (e.g., where the DC-pass, filtering capacitor can remove alternating current ripple and some high frequency noise);

where s equals jω, where ω (in radians) is 2π multiplied by the frequency in Hertz and j is an imaginary number, and where 1/s is the Laplace frequency domain;

$U_{DAB}$ is the observed (e.g., $V_2$) voltage (or estimated voltage) across the terminals of the secondary capacitor 20;

where Q (in the above context) represents a low-pass filter transfer function H(s) (that is selected based on its Q quality magnitude versus frequency response) in the Laplace frequency domain that has a bandwidth for reducing the noise error and to realize the application of the derivative function of the change in the output voltage $U_{DAB}$ in the time domain;

$I_{DAB}$ is the observed output current or observed load current (e.g., through the load) at the secondary DC output terminals;

$I_{cmd}$ is the commanded output current at the secondary DC output terminals (e.g., at the positive DC bus.

The above commanded output current 202 ($I_{cmd}$) is generally defined as flowing into the (node at the) parallel connected capacitor 20 and load 24 (e.g., in FIG. 1A, 1B and FIG. 9B), where the output current (flowing out of the same node) is divided between the parallel connected capacitor and the load, and where the commanded output current is susceptible to current error.

If the low-pass filter 222 has a transfer function of $$H(s) = \frac{\alpha}{s + \alpha},$$

then a first order low-pass filter is realized in the Laplace frequency domain, where α represents the bandwidth of a low-pass filter, which is equivalent to its cut-off frequency, and where s equals jω, where ω (in radians) is 2π multiplied by the frequency in Hertz and j is an imaginary number. The equivalent first order low-pass filter can be expressed in the time-domain $\alpha e^{-\alpha t}$.

In an alternate embodiment, the low-pass filter 222 can be realized as a digital filter, such as an infinite impulse response digital filter, a finite impulse response digital filter, or as a hybrid filter based on the infinite impulse response and finite impulse response filters, where the arrangement of delay lines (e.g., shift registers), summers, and filter coefficients can define the filter response, alone or together with amplifiers.

In another embodiment, the low-pass filter 222 can be realized as an analog, series resistor-capacitor circuit in which the voltage input is defined by the outer terminals of the resistor and capacitor that are coupled in series, and where the output voltage is defined between the terminals of the capacitor.

Within a certain bandwidth (e.g., aligned with the bandwidth of interest or passband of the low-pass filter), the current error can be estimated based on the following equation:

$$f_{DT} = C\frac{dU_{DAB}}{dt} + I_{DAB} - I_{cmd}$$

where $f_{DT}$ is the current error between the ideal output current and the actual output current that is influenced or disturbed by deadtime;

where C is the secondary capacitor between secondary DC output terminals;

$u_{DAB}$ is the voltage or voltage potential between the terminals of the capacitor C;

$$\frac{U_{DAB}}{dt}$$

is the derivative of the observed output voltage between the terminals of the capacitor, C, (e.g., 20), where the derivative measures an alternating current component or transient of predominately direct current output at the secondary DC (output) terminals (e.g., 86);

$I_{DAB}$ is the observed output current or observed load current at the secondary DC output terminals;

$I_{cmd}$ is the commanded output current associated with (e.g., applied as input to) the secondary DC (output) terminals (e.g., 86).

The capacitor current ($I_c$) through the secondary capacitor is defined by $I_c = C\ dV/dt$. The derivative, $$\frac{U_{DAB}}{dt},$$

(which is analogous to dV/dt) of the observed output voltage (or estimated output voltage) between the terminals of the capacitor C, is realized at the output of the low-pass filter 222 that conforms to a suitable transform function H(s) for a single order, second order or third order filter, where the Q increases from the single order to the second order and from the first or second order to the third order.

In FIG. 2, the input to the low-pass filter 222 is the sum the negative commanded output current ($-I_{cmd}$), the observed output current ($I_{DAB}$) at the secondary DC (output) terminals (e.g., 86) of the DC-to-DC converter (12, 112), and the estimated or modeled filtering capacitor current ($sCU_{DAB}$) flowing through the actual secondary capacitor 20, C, is the equivalent of 2π multiplied by the switching frequency, multiplied by the capacitance, and multiplied by the observed output voltage. Here, for example, the modeled filtering capacitor 228 is a virtual or modeled representation of the secondary capacitor within the deadtime compensation module stored in the data storage device. Accordingly, the estimated capacitor current flowing through the secondary capacitor 20, C, is frequency dependent (e.g., based on the fundamental switching frequency or pulse width modulation frequency); the estimated capacitor current is susceptible to some alternating-current frequency components in the current error and/or noise error, which can also be expressed as the following current error expression (in the frequency domain) in the above equation: ($sCU_{DAB}+I_{DAB}-I_{cmd}$), where the deadtime compensation can use the deadtime phase shift (φ) or compensating phase shift angle 216 to adjust the commanded current to cancel out all or some portion of the current error (e.g., after filtering or attenuating noise error with the low-pass filter 222 that outputs current error $f_{DT,e}$ 220).

In one embodiment, the deadtime compensation module 92 is configured to generate a compensating phase shift (φ) 216 between corresponding semiconductor switches of the primary converter (10, 110) and the secondary converter (12, 112) to compensate for the error or difference associated with the deadtime with potential attenuated components in the error arising from sensor noise of the current estimator, the voltage estimator, or both. The deadtime compensation module 92 may be operated or executed in accordance with various techniques, which can be applied separately or cumulatively.

Under a first technique, the deadtime compensation module 92 or electronic data processor 32 is configured to adjust a phase offset between a low-side switch and a high-side switch of the primary converter or the secondary converter consistent with a target duty cycle (e.g., approximately 50 percent duty cycle).

Under a second technique, the deadtime compensation module 92, or hysteresis loop module 218, or electronic data processor 32 is configured to apply an adaptive hysteresis loop to reduce the error over one or more successive measurement intervals of the sensors.

Under a third technique, the deadtime compensation module 92, or hysteresis loop module 218, or electronic data processor 32 controls the maximum compensating phase shift of adaptive hysteresis loop to be limited to, or bound by, or proportional to the switching frequency and the deadtime duration in the primary converter or secondary converter.

Under a fourth technique, the deadtime compensation module 92, or hysteresis loop module 218, or electronic data processor 32 controls the adaptive hysteresis loop based on the operating point of the converter, such as dual-active-bridge (DAB) converter power equations.

Under a fifth technique, the deadtime compensation module the deadtime compensation module 92, or hysteresis loop module 218, or electronic data processor 32 is configured to adjust the phase shift based on the error consistent with maintaining a zero-voltage-switching (ZVS) state within the primary and secondary switches of the converter.

Under a sixth technique, the bandwidth of the deadtime compensation is greater than a bandwidth of a voltage regulation loop of the secondary DC bus output.

Under a seventh technique, the deadtime compensation module 92, or hysteresis loop module 218, or electronic data processor 32 is targeted toward compensating for (e.g., minimizing, reducing, attenuating or ameliorating) a feedforward component of the target output current that is susceptible to current oscillation of the load current.

Figure 3:
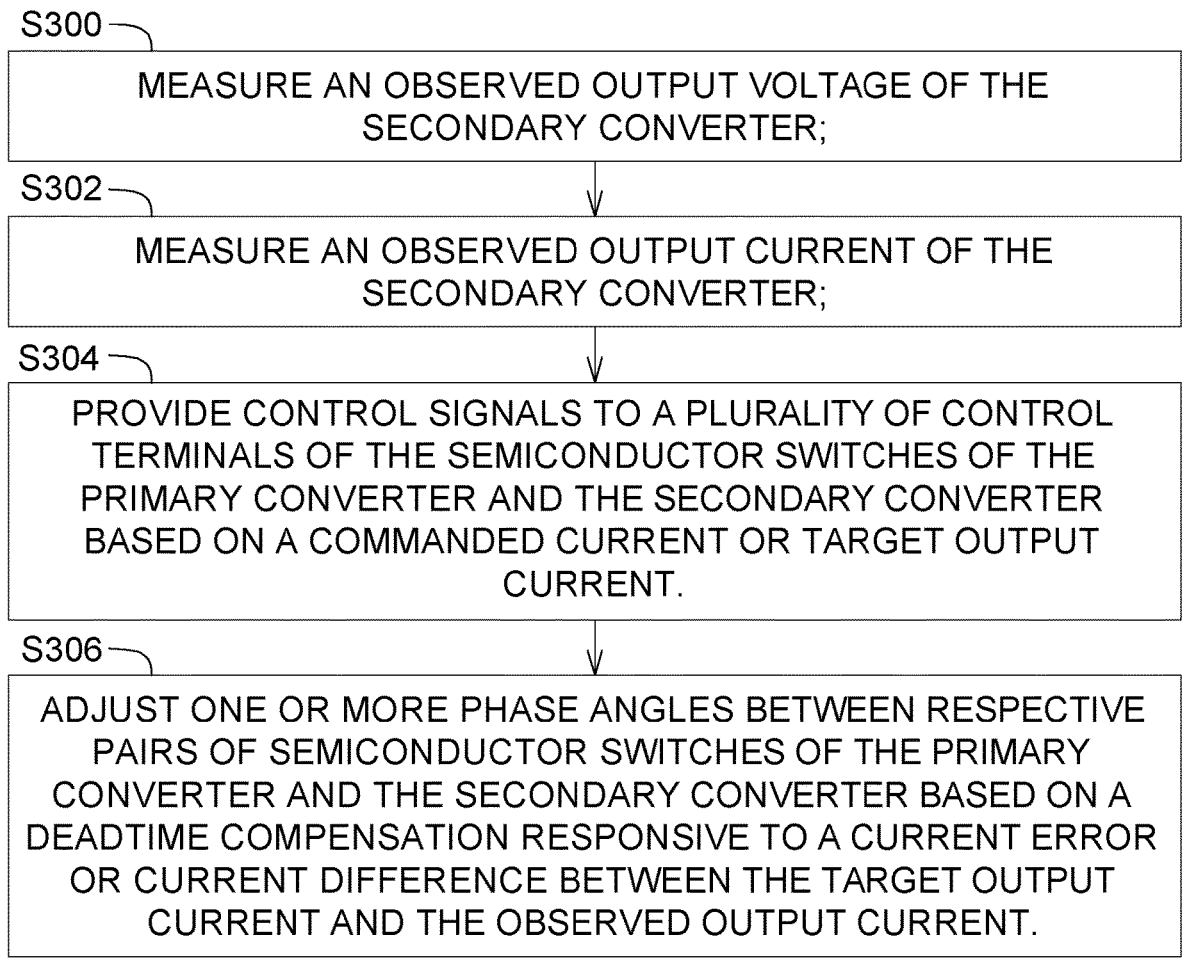
FIG. 3 is a flow chart of a first embodiment of a method for controlling a direct-current-to-direct-current-converter based on deadtime compensation.

FIG. 3 is a flow chart of a first embodiment of a method for controlling a direct-current-to-direct-current-converter (11, 111, 211, 411) based on deadtime compensation. The method of FIG. 3 begins in step S300.

In step S300, a voltage sensor (46, 146, 48, 148, 906, or current sensor 908) is configured to measure (or to estimate) the observed output voltage of the secondary converter (12, 112, 412). For example, the voltage sensor (46, 146, 48, 148, 906, or current sensor 908) is coupled to an analog-to-digital converter in communication with the data port 42; the electronic data processor 32 reads the observed output voltages and applies the electrical property sensing module 94, measure (e.g., measure, determine, or estimate) the observed output voltage of the secondary converter (12, 112, 412) over one or more sampling intervals.

In step S302, a current sensor 90 is configured to measure (or to estimate) the observed output current of the secondary converter (12, 112, 412). For example, the current sensor 90 is coupled to an analog-to-digital converter in communication with the data port 42; the electronic data processor 32 reads the observed current voltages and applies the electrical property sensing module 94, measure (e.g., measure, determine, or estimate) the observed output current of the secondary converter (12, 112, 412) over one or more sampling intervals.

In step S304, the electronic data processor 32, driver 217, deadtime compensation module 92, or phase shift scheme provides control signals to a plurality of control terminals of the semiconductor switches (68, 936, 937, 939) of the primary converter and the secondary converter based on a commanded current or target output current. In some embodiments, the deadtime compensation module 92 comprises the driver 217 with the phase shift scheme or the phase shift scheme is an integral facet or component of the deadtime compensation module 92.

In step S306, the electronic data processor 32, driver 217, deadtime compensation module 92, or controller (38, 920) is configured to adjust one or more phase angles (e.g., by one or more compensating phase shifts, φ) between respective pairs of semiconductor switches of the primary converter and the secondary converter (e.g., compensating phase shifts for pairs S1 and S7; S2 and S8; S3 and S9; S4 and S10, S5 and S11, and S6 and S12 within appropriate duty cycle limits (e.g., any permitted deviation from 50 percent duty cycle) for each low-side and high-side switching phase) based on deadtime compensation responsive to a current error or current difference between the target output current and the observed output current. Step S306 may comprise one or more of the following techniques that may be applied individually or collectively.

Under a first technique, the deadtime compensation module 92 comprises a low-pass filter 222 and defines an open-loop estimator (e.g., electrical current error estimator), based on the $f_{DT,e}$ and for equations, set forth in this disclosure, which can be used to estimate any electrical current mismatch or deviation between the commanded current ($I_{cmd}$) and actual output current at the load 24, such as the output terminals of the output bridge or secondary converter (12, 112, 412).

Under a second technique, the deadtime compensation module 92 comprises a low-pass filter 222 with the bandwidth, cut-off frequency, or quality, Q, ratio that establishes the bandwidth of the open-loop estimator; the bandwidth of the open-loop estimator should be higher than that of the voltage regulation loop of the (dual-active-bridge (DAB)) voltage controller 200.

Under a third technique, the data processor 32, hysteresis loop module 218, or deadtime compensation module 92 can dynamically or adaptively adjust the bandwidth, cut-off frequency, or quality, Q, ratio of the low-pass filter 222 (e.g., by adjusting coefficients of a digital filter realized by digital electronics or the electronic data processor 32 and its registers) to attenuate the deadtime disturbance based on the characteristics of the deadtime disturbance. The characteristics of the deadtime disturbance may include any of the following: deadtime duration, fundamental switching frequency, estimated current error, reference hysteresis loop of current error versus compensating phase shift (e.g., see FIG. 11), feedforward current commands, measurement noise, component tolerances, operating point (e.g., power demand of load 24, efficiency of the DC-DC converter, transient changes in the load 24, or the like. For example, the data processor 32, hysteresis loop or deadtime compensation module 92 may set a hysteresis threshold on changes in the above characteristics such that the deadtime compensation module 92 is only triggered to provide a compensating phase shift and/or compensating current correction to the commended current only based on selective determination of a deadtime disturbance arising from deadtime, as opposed to other distinct transient disturbances.

Under a fourth technique, the data processor 32, or the deadtime compensation module 92 92, the hysteresis loop module 218 (e.g., adaptive hysteresis loop module) comprises a compensator that is used to directly compensate the phase-shift angle.

FIG. 4 is a flow chart of second embodiment of a method for controlling a direct-current-to-direct-current-converter based on deadtime compensation. The method of FIG. 4 is similar to the method of FIG. 3, except the method of FIG. 4 further comprises step S307. Like reference numbers in FIG. 3 and FIG. 4 indicate like features, steps or procedures.

In step S307, the controller, the data processor 32, or the deadtime compensation module 92 is configured to set, establish or adjust a quality ratio and/or cut-off frequency of a low-pass filter 222 that enables the current error to be estimated within a limited bandwidth (e.g., half-power bandwidth) of the low-pass filter 222 (e.g., tuned to attenuate materially a corresponding frequency range or resonant frequency range associated with a disturbance associated with the current error). In some configuration of the low-pass filter 222 or other quasi-low-pass filter 222, the Q ratio is inversely proportional to the bandwidth of the low-pass filter 222.

Figure 5:
FIG. 5, which comprises FIG. 5A and FIG. 5B, collectively, is a flow chart of a third embodiment of a method for controlling a direct-current-to-direct-current-converter based on deadtime compensation.
Figure 5:
Figure 5A:
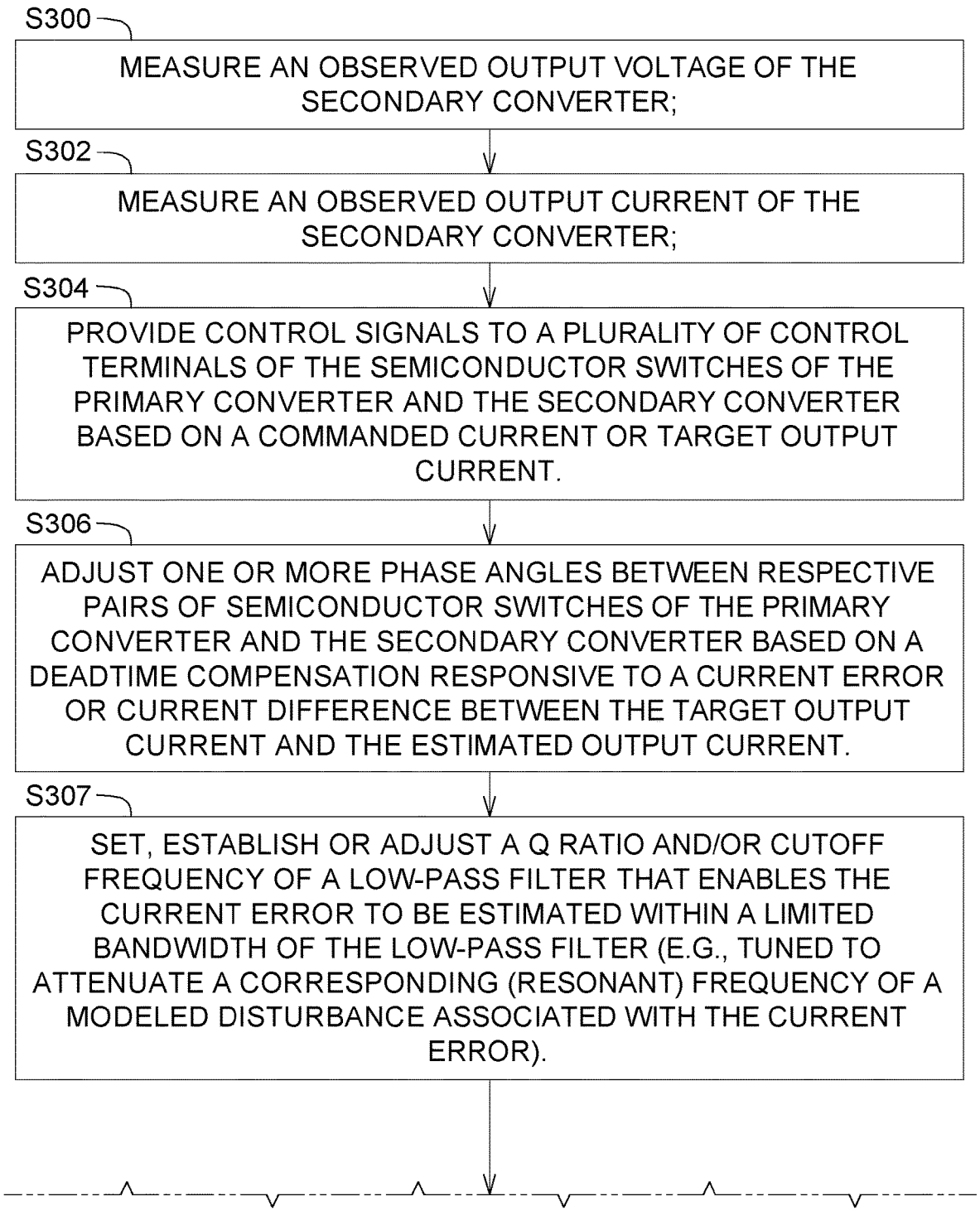

FIG. 5, which comprises FIG. 5A and FIG. 5B, collectively, is a flow chart of a third embodiment of a method for controlling a direct-current-to-direct-current-converter based on deadtime compensation. The method of FIG. 5 is similar to the method of FIG. 4, except the method of FIG. 5 further includes step S309.

In step S309, the controller, the data processor 32, or the deadtime compensation module 92 is configured to estimate the current error within a certain bandwidth defined by the Q ratio and/or cut-off frequency. For example, the controller, the data processor 32 or the deadtime compensation module 92 is configured to estimate the current error based on the following equation:

$$f_{DT} = C\frac{dU_{DAB}}{dt} + I_{DAB} - I_{cmd}$$

where $f_{DT}$ is the current error between the ideal output current and the actual output current that is influenced or disturbed by deadtime;

where C is the secondary capacitor between secondary DC output terminals, which is expressed as capacitance in Farads;

$u_{DAB}$ is the voltage or voltage potential between the terminals of the capacitor C;

$$\frac{U_{DAB}}{dt}$$

is the derivative with respect to time of the observed output voltage between the terminals of the capacitor C (e.g., 20), where the derivative measures an alternating current component or transient of predominately direct current output at the secondary DC output terminals (e.g., 86);

$I_{DAB}$ is the observed output current or observed load 24 current at the secondary DC (output) terminals;

$I_{cmd}$ is the commanded output current associated with (e.g., applied as input to) the secondary DC (output) terminals (e.g., 86).

Figure 6:
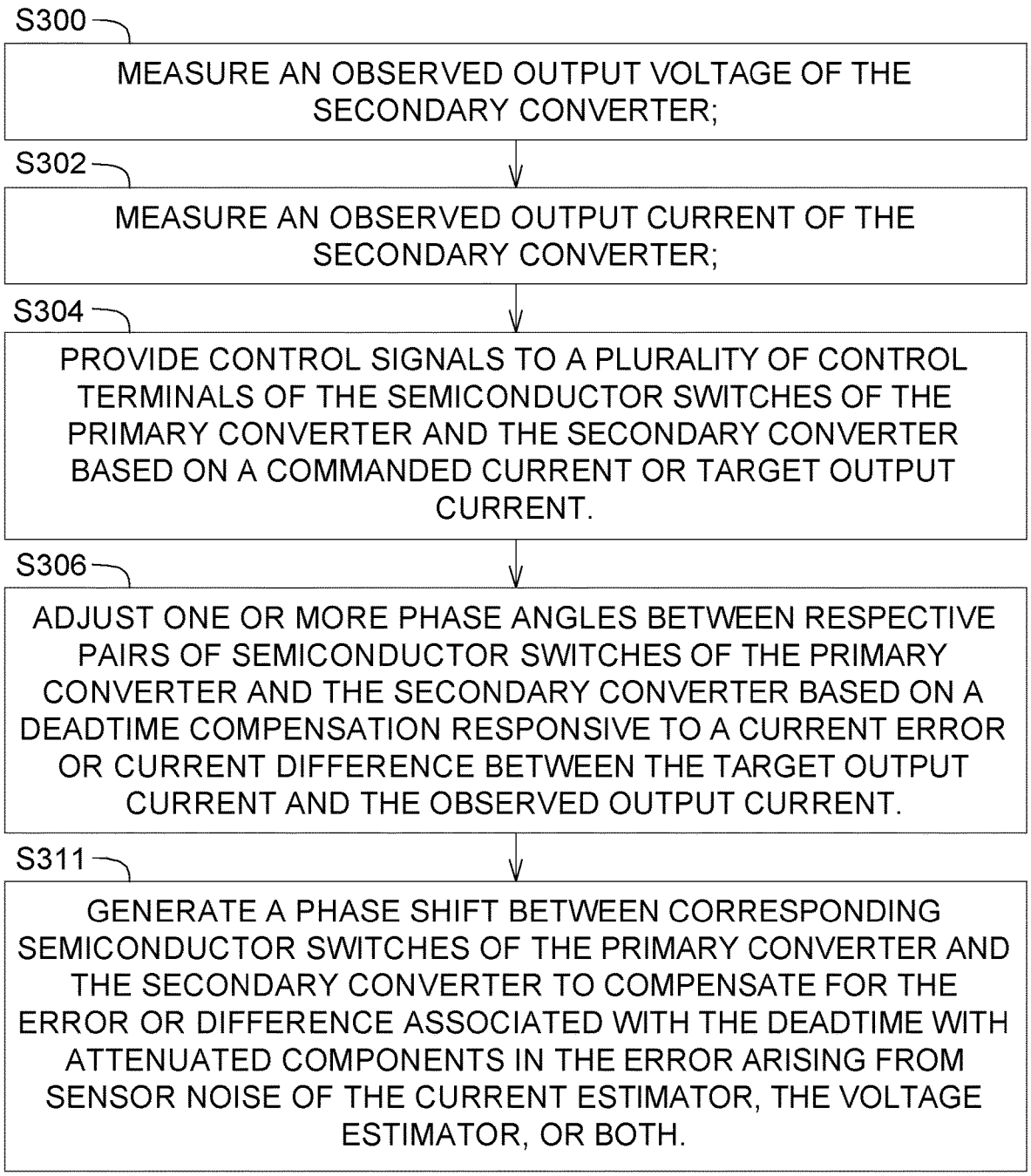
FIG. 6 is a flow chart of a fourth embodiment of a method for controlling a direct-current-to-direct-current-converter based on deadtime compensation.

FIG. 6 is a flow chart of a fourth embodiment of a method for controlling a direct-current-to-direct-current-converter based on deadtime compensation. The method of FIG. 6 is similar to the method of FIG. 3, except the method of FIG. 6 further includes step S311.

In step S311, the controller, the electronic data processor 32, or the deadtime compensation module 92 is configured to generate a phase shift between corresponding semiconductor switches of the primary converter and the secondary converter to compensate for the error or difference associated with the deadline with attenuated components (e.g., attenuated by the low-pass filter 222) in the error arising from sensor noise of the current estimator, the voltage estimator, or both. Further, the controller, the electronic data processor 32, or the deadtime compensation module 92 may comprise a low-pass filter 222 that facilitates estimation of the current error for compensation in or to the commanded current. For example, a summer 204 or a voltage controller 200 can be configured to add or subtract a compensating current can be added or subtracted from the commanded current ($I_{cmd}$) to reduce the current error. The compensating current can be used alone, or together with, the compensating phase shift ($\phi$ or $\phi_0$).

Figure 7:
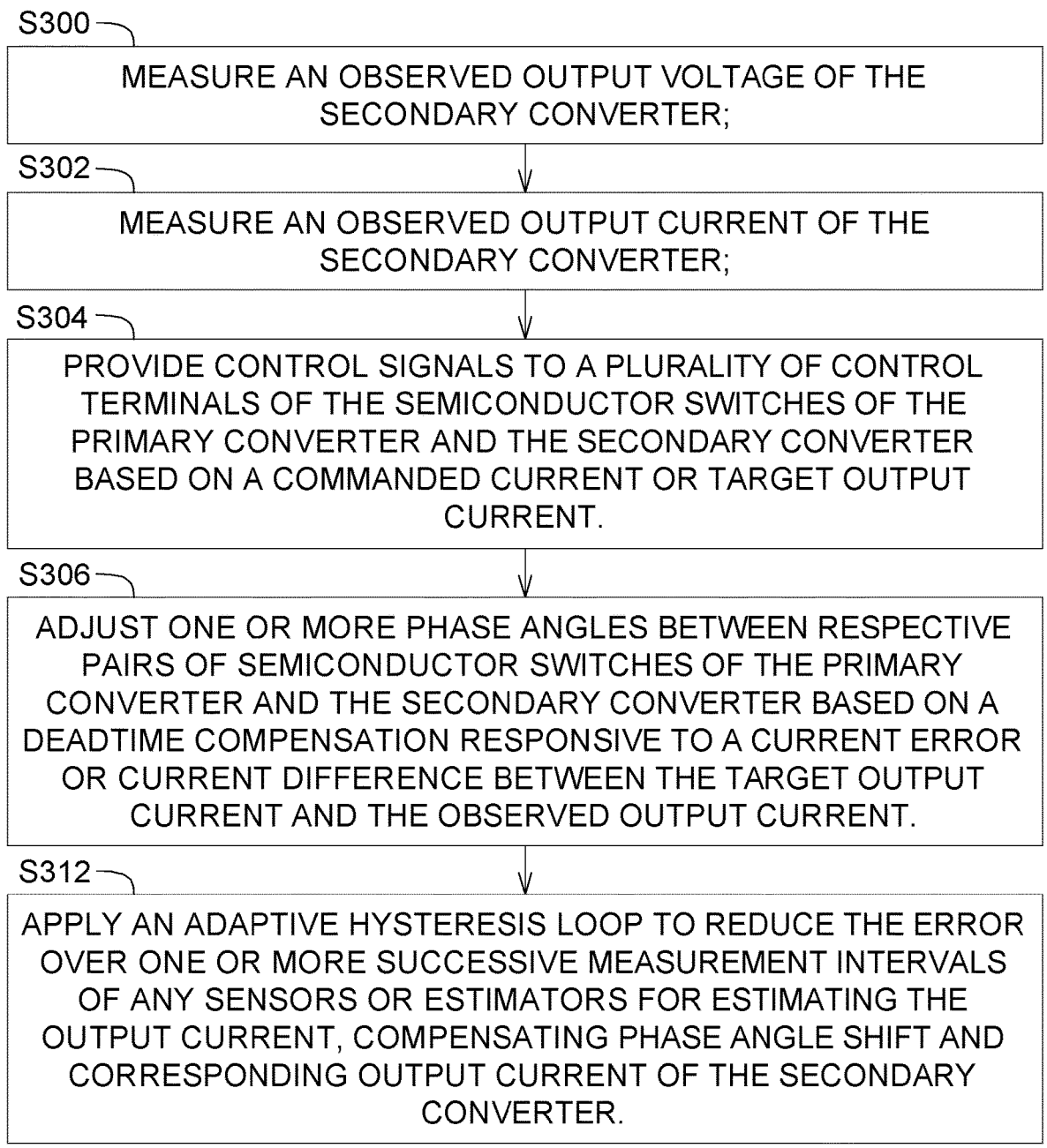
FIG. 7 is a flow chart of a fifth embodiment of a method for controlling a direct-current-to-direct-current-converter based on deadtime compensation.

FIG. 7 is a flow chart of a fifth embodiment of a method for controlling a direct-current-to-direct-current-converter based on deadtime compensation. The method of FIG. 6 is similar to the method of FIG. 3, except the method of FIG. 6 further includes step S312.

In step S312, the controller, the electronic data processor 32, the deadtime compensation module 92, or the hysteresis loop module 218 is configured to apply an adaptive hysteresis loop to reduce the error over one or more successive measurement intervals of any sensors or estimators for estimating the compensating phase angle shift and the corresponding output current (e.g., of the secondary converter). For example, the adaptive hysteresis loop module 218 is associated with the low-pass filter 222 that dynamically can adjust any of the following filter characteristics: (a) the Q quality factor, (b) the cut-off frequency, and/or (c) bandwidth based on the deadtime characteristics (e.g., deadtime duration, switching frequency, current error, reference hysteresis loop between current error and corresponding compensating phase shift) operating point or operating load 24 on the DC-to-DC converter, which can be defined by the load 24 current (e.g., expressed in Amps) or load 24 power (e.g., expressed in Kilowatts), where the DC input voltage, DC output voltage are known, the transformer primary to secondary turns ratio is known, and the output capacitance is known (e.g., stored in a lookup table, inverted file, file or other records in the data storage device).

Figure 8:
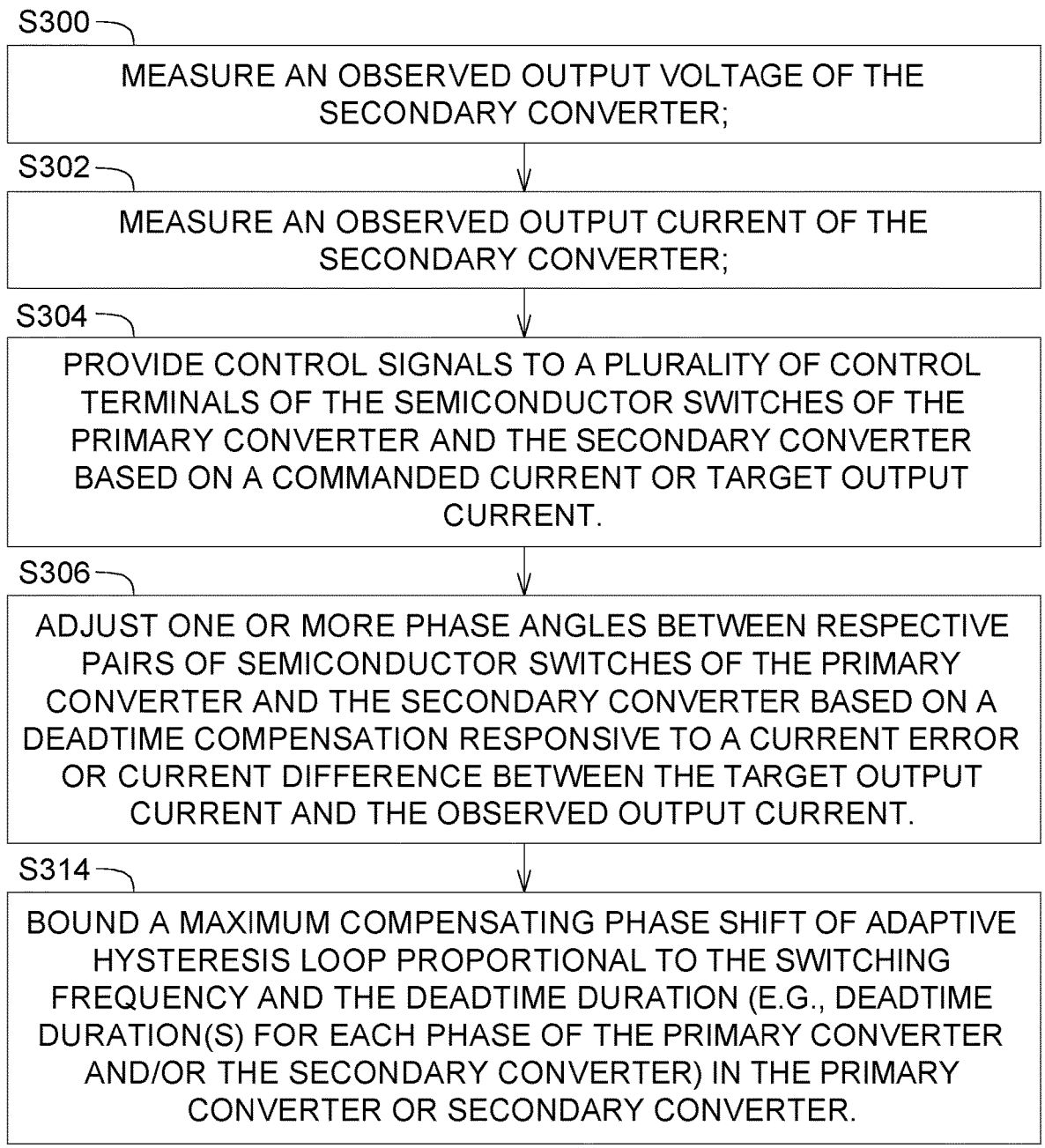
FIG. 8 is a flow chart of a fifth embodiment of a method for controlling a direct-current-to-direct-current-converter based on deadtime compensation.

FIG. 8 is a flow chart of a fifth embodiment of a method for controlling a direct-current-to-direct-current-converter based on deadtime compensation. The method of FIG. 8 is similar to the method of FIG. 3, except the method of FIG. 6 further includes step S314.

In step S314, the controller, the electronic data processor 32, the deadtime compensation module 92, or the hysteresis loop module 218 is configured to limit or bound a maximum compensating phase shift of the adaptive hysteresis loop to be proportional to the switching frequency and the dead time duration in the primary converter or the secondary converter. Step S314 can be executed to control, limit or bound the deadline duration(s) for each phase of the primary converter and/or secondary converter over one or more sampling intervals.

Figure 9A:
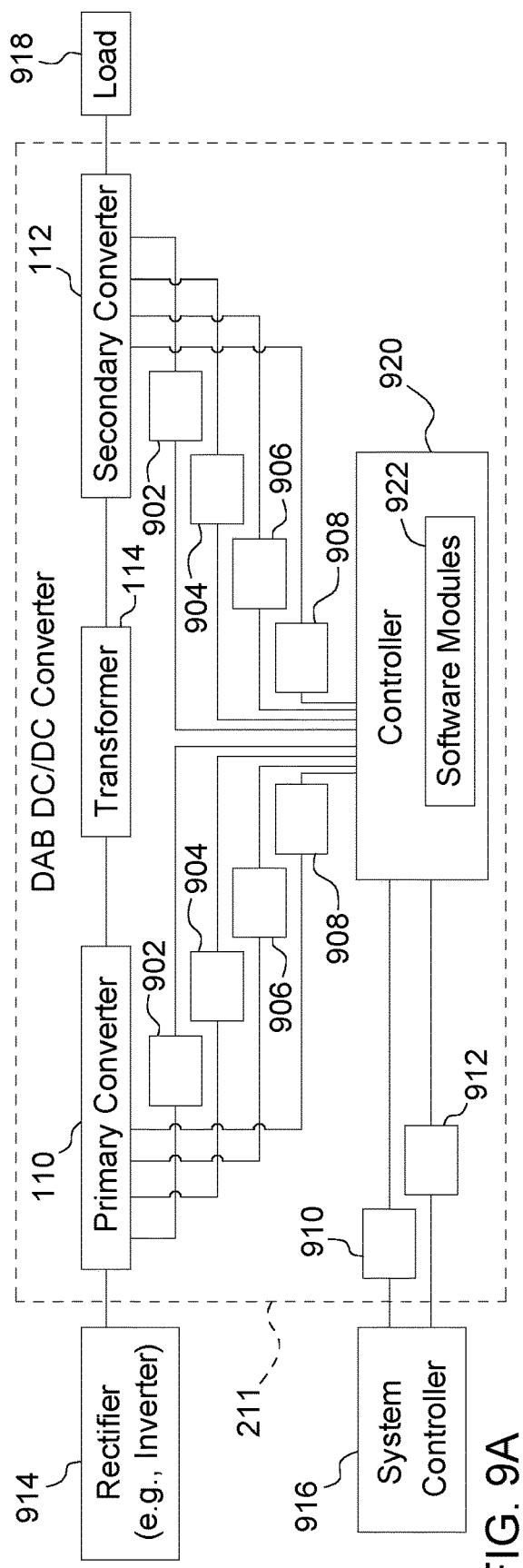
FIG. 9A is a block diagram of one embodiment of a direct-current-to-direct-current converter that comprises a primary full bridge converter coupled to a secondary full bridge converter via a transformer.

FIG. 9A is a block diagram of one embodiment of a direct-current-to-direct-current converter 211 that comprises a primary full bridge converter 110 coupled to a secondary full bridge converter 112 via a transformer 114. Like reference numbers in FIG. 1B and FIG. 9A indicate like elements or features.

In FIG. 9A, the dual-active bridge DC-DC converter 211 comprises a primary converter 110 and a secondary converter 112 coupled to a transformer 114. The input of the primary converter 110 may be associated with an energy source, such as a battery pack, an ultracapacitor, or a rectifier 914 (e.g., bidirectional inverter) that rectifies alternating current power generated by an electric machine (e.g., alternator), or from the electrical grid. The secondary output of the secondary converter 112 is coupled to a load 918.

An electronic controller 920 is coupled to the primary converter 110 and the secondary converter 112. The electronic controller 920 has one or more software modules 922, such as a deadtime compensation module 92 and/or a current (error) correction module 95, or both, where the deadtime compensation module 92 is configured to provide a compensating phase offset and where the current (error) correction module 95 is configured to provide a correction data to the commanded current (e.g., via a positive or negative input to summer 204 in FIG. 2).

In one embodiment, the primary converter 110 comprises a (gate or switch) driver 902 and one or more of the following sensors: a temperature sensor 904, a voltage sensor 906, and a current sensor 908. Meanwhile, the secondary converter 112 comprises a (gate or switch) driver 902 and one or more of the following sensors: a temperature sensor 904, a voltage sensor 906, and a current sensor 908.

The electronic controller 920 is coupled to a system controller 916 that can communicate via a vehicle data bus 910 (e.g., controller are network (CAN) data bus) and a battery management system data bus 912.

Figure 9B:
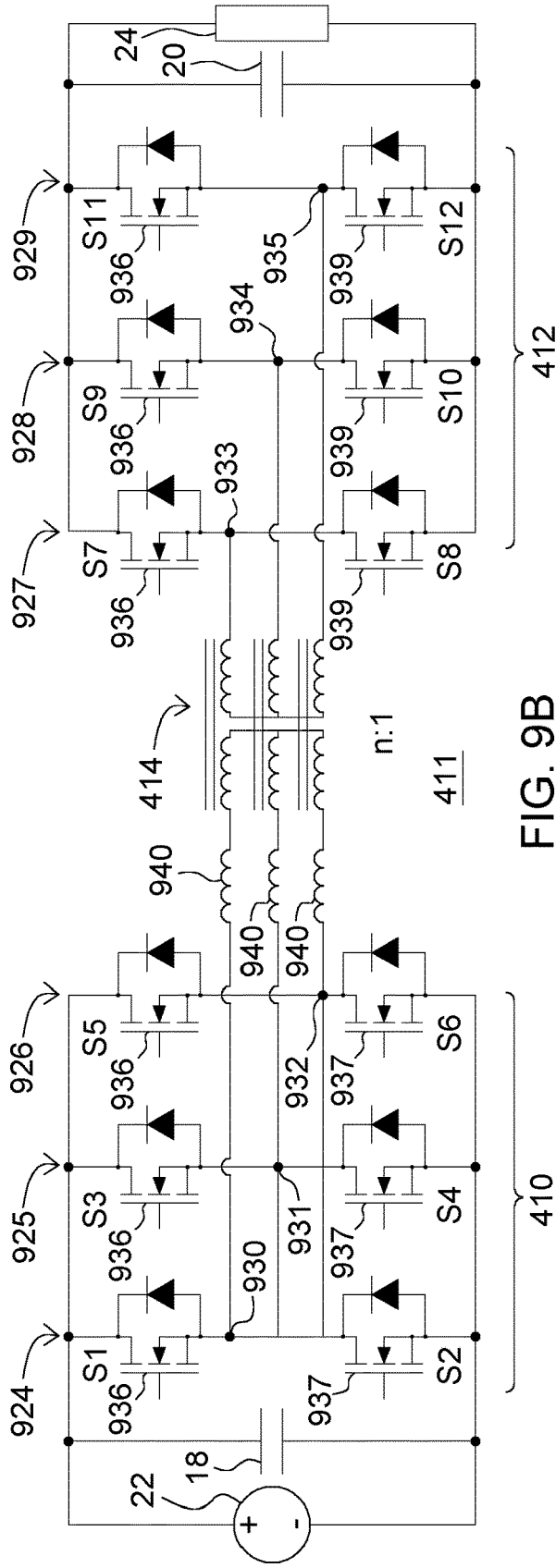
FIG. 9B is a schematic diagram of another embodiment of a direct-current-to-direct-current converter that comprises a primary full bridge converter coupled to a secondary full bridge converter via a transformer with three-phase windings.

FIG. 9B is a schematic diagram of another embodiment of a direct-current-to-direct-current converter that comprises a primary full bridge converter coupled to a secondary full bridge converter via a transformer with three-phase windings. The DC-to-DC converter of FIG. 9B is similar to the DC-to-DC converter of FIG. 1A and FIG. 1B that featured a single-phase (full-bridge) primary converter (10, 110), a single-phase (full-bridge) secondary converter (12,112), and a single-phase transformer (14,114), except the DC-DC converter of FIG. 9B has a three-phase primary converter (410), a three phase secondary converter (412) and transformer 414 with three-phase windings.

In FIG. 9B, the DC terminals of the primary converter 410 are coupled to the primary capacitor 18 and an energy source 22, such as a battery. Each phase (924, 925, 926) of primary converter 410 comprises pair of a low-side semiconductor switch 937 and a high-side semiconductor switch 936. For example, the first phase 924 comprises the pair of semiconductor switches (S1 and S2); the second phase 925 comprises the pair of semiconductor switches (S3 and S4); the third phase 926 comprises the pair of semiconductor switches (S5 and S6). The primary converter 410 has three alternating-current (AC) phase nodes or AC terminals (930, 931, 932). Each AC phase node is coupled to the primary windings of the transformer 414 via integral inductances 940 (or similar discrete inductors)(e.g., to facilitate the transfer of energy from the primary converter 410 to the secondary converter 412; henceforth, to the load 24).

The AC phase nodes (933, 934, 935) of the secondary converter 412 (e.g., rectifier) are coupled to respective pairs of low-side semiconductor switches 939 and high-side semiconductor switches 938. For example, the first phase 927 or first half-bridge comprises the pair of semiconductor switches (S7 and S8); the second phase 928 or second half-bridge comprises the pair of semiconductor switches (S9 and S10); the third phase 929 or third half-bridge comprises the pair of semiconductor switches (S11 and S12). The DC terminals of the secondary converter 412 are coupled to the secondary capacitor 20 and the load 24. The electronic controller of FIG. 1A, FIG. 1B, or FIG. 9A can be configured to or adapted to provide control signals to the control terminals of all three phases or half-bridges of the semiconductor switches of FIG. 9B.

Figure 10A:
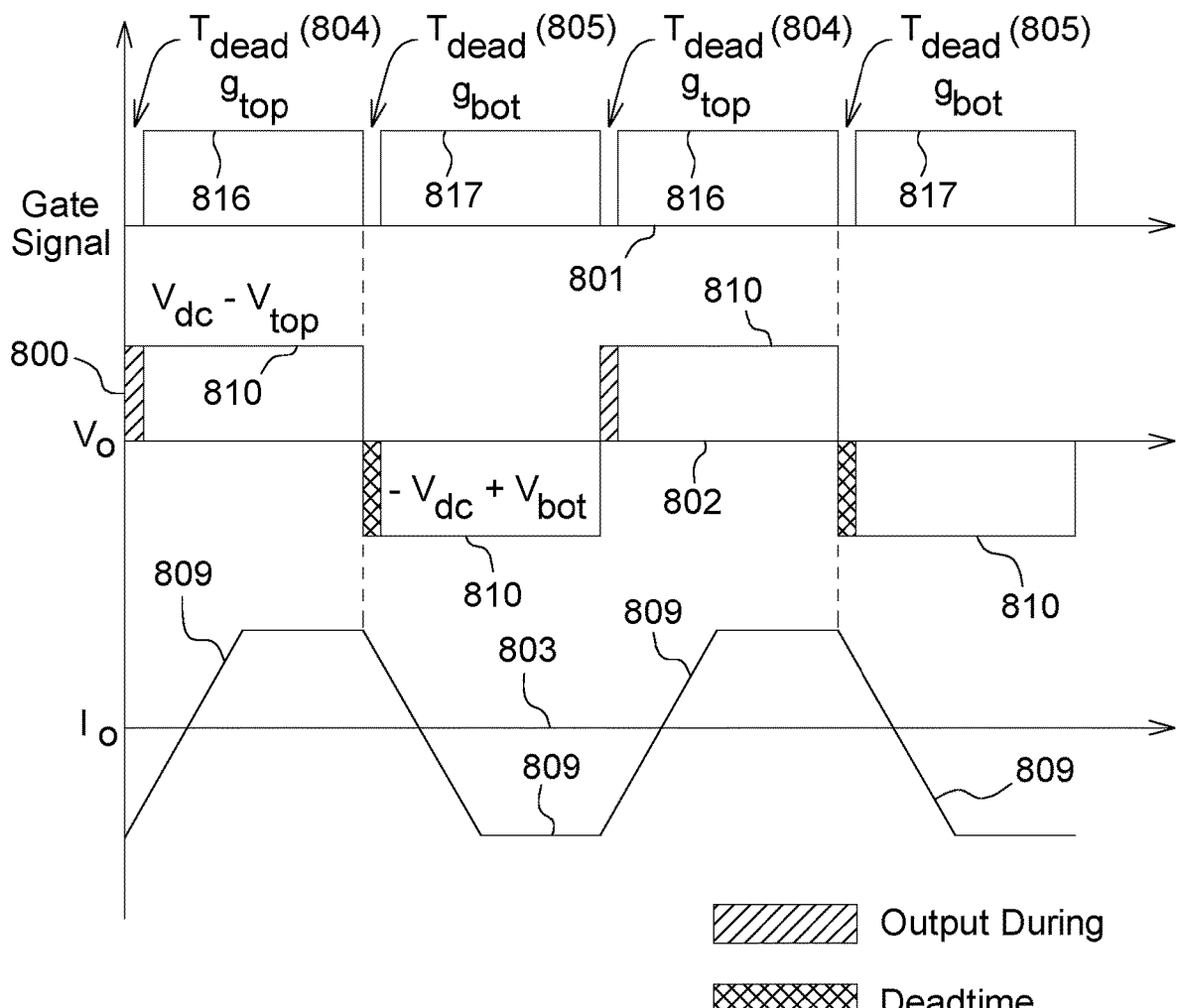
FIG. 10A is chart that shows time on the horizontal axis and signal magnitude on one of three vertical axes, where the relationship to deadtime is illustrated.

FIG. 10A is chart that shows time on each of the three horizontal axes (801, 802, 803) and signal magnitude on the vertical axes 800, where the relationship to deadtime is illustrated. The vertical axis 800 has different magnitude scales for each set of signals.

In FIG. 10A, the uppermost graph is pulse train of control signals outputted by a driver to a pair of low-side semiconductor and high-side semiconductor. As illustrated the control signals are rectangular waveforms, such as square waves. From the left side of the uppermost graph, the first pulse 816 is applied as a first control signal to the control terminal 806 of the high-side switch; the second pulse 817 is applied as a second control signal to the control terminal 807 of the low-side switch; the third pulse 816 is applied as a third control signal to the control terminal 806 of the high-side switch; the fourth pulse 817 is applied as a fourth control signal to the control terminal 807 of the low-side switch. Between time zero and the leading edge of the first pulse 816, a deadtime 804 is present and is referred to as $T_{dead1}$; between the trailing edge of the first pulse 816 and the leading edge of the second pulse 817, a deadtime 805 is present and is referred to as $T_{dead2}$. Similarly, between the training edge of the previous pulse and the leading edge of the third pulse 816, a deadtime 804 is present and is referred to as Tdead1; between the trailing edge of the third pulse 816 and the leading edge of the fourth pulse 817, a deadtime 805 is present and is referred to as $T_{dead2}$.

In FIG. 10A, the middle graph is pulse train 810 of control signals outputted by a driver to a pair of low-side semiconductor and high-side semiconductor. As illustrated the control signals are rectangular waveforms, such as square waves. The zero volts DC is indicated by the horizontal axis 802. The signal magnitude of the pulse train 810 is shown relative to the output voltage Vo at zero volts direct current. In the middle graph, the single-hatched fill indicates the voltage output Vo for positive pulses of the pulse train 810 during deadtime, which can be zero volts during the deadtime because the leading edge of the positive pulse is delayed by the deadtime duration. Similarly, the deadtime regions for negative pulses of the pulse train 810 are indicated by the double cross-hatched fill pattern, which can be zero volts because the leading edge of the negative pulse is delayed by the deadtime duration. The middle graph illustrates that the peaks, tops and bottoms of the pulse train of control signals are less than positive Vdc and negative Vdc, which can indicate voltage sag or droop associated with the load 24, or a virtual series resistance associated with the DC voltage bus.

In FIG. 10A, the bottom graph is the output current waveform 809 at the phase output node of the primary converter of the DC-to-DC converter. The zero current is indicated by the current axis 803 (Io), where the waveform is somewhat clipped or limited at its peak current from an ideal waveform (e.g., reference triangular waveform or reference sinusoidal output waveform).

Figure 10B:
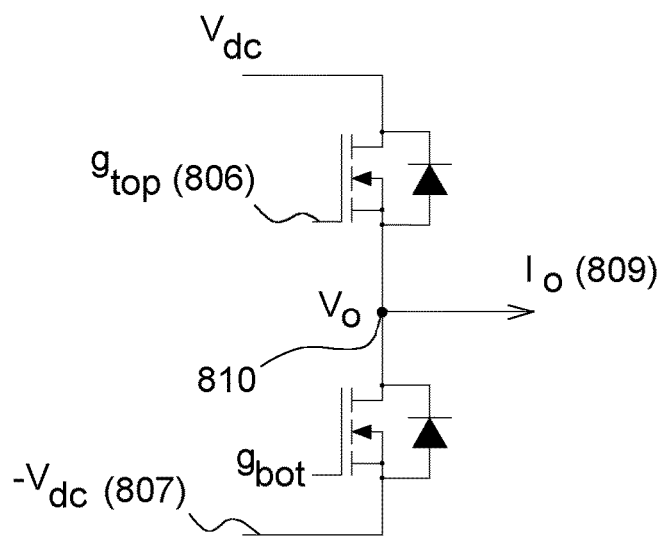
FIG. 10B is a schematic that illustrates on possible configuration of a pair of low-side switches and high-side switches within the primary converter, the secondary converter, or both of the DC-to-DC converter.

FIG. 10B is a schematic that illustrates on possible configuration of a pair of low-side switch (937, 939) and high-side switch (936, 938) within the primary converter 410, the secondary 412 converter, or both of the DC-to-DC converter. The low-side switch (937, 939) has a control terminal 807, which is labeled $g_{bot}$ for bottom gate. The high-side switch (936, 938) has a control terminal 806, which is labeled $g_{top}$ for bottom gate.

In FIG. 10A and FIG. 10B, the voltage output 810 is labeled Vo; the current output 809 is labeled Io, and the direct current (DC) terminals or DC voltage bus 807 is labeled Vdc and −Vdc.

Figure 11:
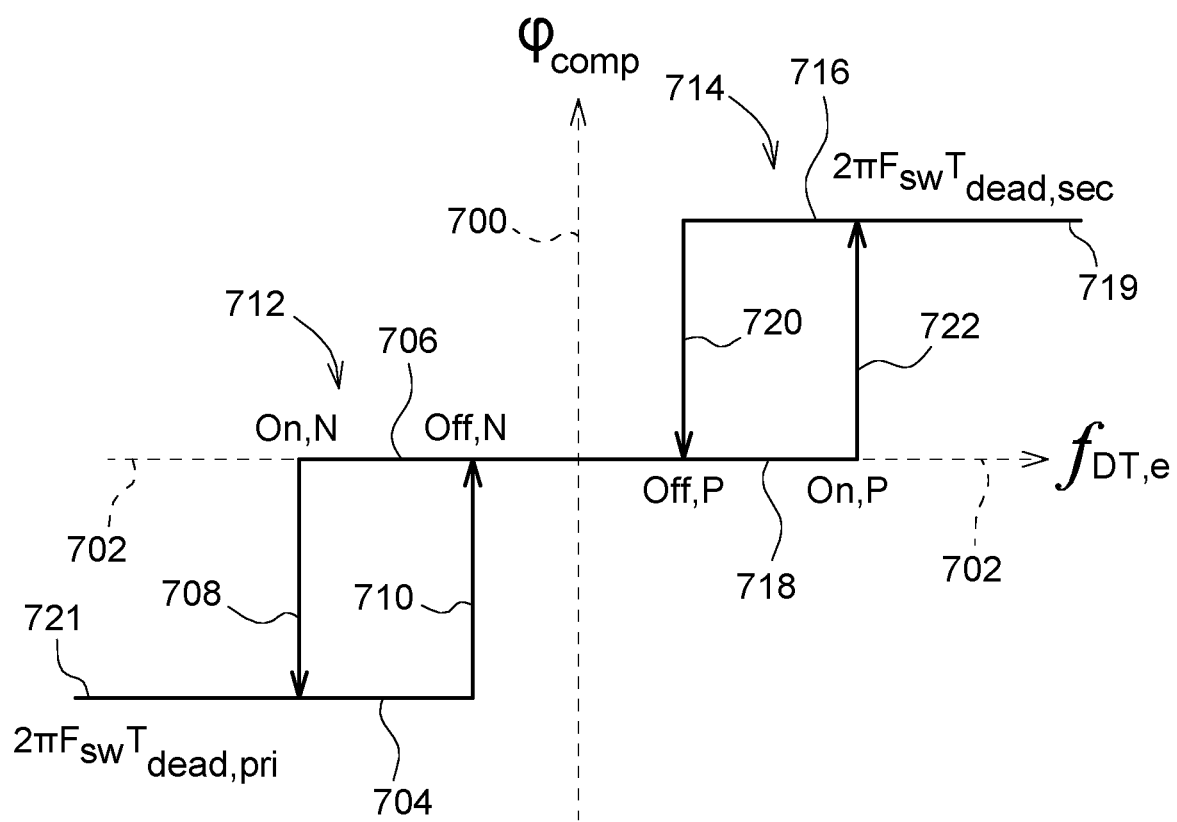
FIG. 11 illustrates a chart of the compensating phase angle versus the current error with hysteresis of the control signal to compensate for deadtime between corresponding switches of the primary converter and the secondary converter.

FIG. 11 illustrates a chart of the compensating phase angle versus the current error with hysteresis of the control signal to compensate for deadtime between corresponding switches of the primary converter and the secondary converter, where the compensating phase angle is bounded by the maintenance of zero volt switching (ZVS) in either the primary converter while the secondary converter is non-compliant with zero volt switching or the maintenance of zero volt switching in the secondary converter while the primary converter is non-compliant with zero volt switching.

In FIG. 11 shows a hysteresis loop (e.g., double hysteresis loop) in which the paths or plots of the corresponding relationship between the compensating phase shift 700 ($\phi$), on the vertical axis, versus the current error 702 ($f_{DT,e}$), on the horizontal axis, differ depend on whether the current error 702 ($f_{DT,e}$) is increasing or decreasing. For example, as the current error 702 ($f_{DT,e}$) on the horizontal axis decreases (e.g., toward labels Off, N state and Off, P state), the compensating phase shift 700 ($\phi$) decreases according to the paths (e.g., 710 and/or 720). On the contrary, as the current error $f_{DT,e}$ on the horizontal-axis increases (e.g., away from labels On, N state and On, P state), the compensating phase shift ($\phi$) increases according to the paths (e.g., 708 and/or 722). The upper linear tail 719 indicates the plot and limit of the positive compensating phase shift (716) and the possible corresponding positive current errors in the first quadrant 714 of the graph of FIG. 11. The lower linear tail 721 indicates the plot and limit of the negative compensating phase shift (704) and the corresponding negative current errors in the third quadrant 712 of the graph of FIG. 11. Along path segments 706, 718, if there is transition between increasing and decreasing compensating phase shift 700 in one of the two hysteresis loops or if there is a transition between the two hysteresis loops, the phase shift may be set to zero, as illustrated.

In FIG. 11, the hysteresis loop can be defined by the following equations:

On,$P = I_{DAB,max} - I_{DAB,0}$

Off,$P = \gamma \times $On,$P$

On,$N = I_{DAB,min} - I_{DAB,0}$

Off,$N = \gamma \times $On,$N$ where γ is a power coefficient (e.g., which indicates the percentage of maximum power rating or power transfer ratio (between input and output terminals) of the DC-to-DC converter.) The power coefficient may represent the total efficiency of the DC-DC converter (11, 111, 211, 411), with contributions from the power factor of the primary converter, the power factor of secondary converter and the efficiency of the transformer, and the capacitance of the output capacitor under a defined load (e.g., percentage of maximum load). For example, the power factor may be expressed as the ratio of the watts per phase/root mean squared (RMS) volt-amperes per phase. The efficiency may vary with the switching frequency and load parameters of the DC-DC converter among other technical specifications.

The hysteresis loop module 218, alone or together with the deadtime compensation module 92, is configured to limit or bound the potential candidates for compensating phase shift ($\phi$) between a minimum compensating phase shift and a maximum compensating phase shift in accordance with the following equation:

$\phi_{min} = \phi_0 - 2\pi T_{dead,pri} F_{sw}$, $\phi_{max} = \phi_0 + 2\pi T_{dead,sec} F_{sw}$, where $\phi_0$ is the ideal compensating phase shift angle (in radians), $T_{dead,pri}$ is the deadtime duration (in seconds) in the primary converter, $T_{dead,sec}$ is the deadtime duration in seconds in the secondary converter, and $F_{sw}$ is the switching frequency or fundamental switching frequency of the primary converter and the secondary converter of DC-to-DC converter.

The ideal phase shift angle ($\phi_0$) is defined as follows:

$$\begin{cases} I_{DAB,0} = \dfrac{nV_{in}\phi_0(4\pi - 3\phi_0)}{6\pi\omega L_s}, & 0 < \phi \leq \dfrac{\pi}{3} \\ I_{DAB,0} = \dfrac{nV_{in}(18\pi\phi_0 - 18\phi_0^2 - \pi^2)}{18\pi\omega L_s}, & \dfrac{\pi}{3} < \phi \leq \dfrac{2\pi}{3} \end{cases},$$

where $V_{in}$ is the input voltage of the primary DC-to-DC converter, n is a turn ratio between the primary and secondary windings of the transformer, Ls is the inductance of the secondary windings (e.g., although usually the leakage inductance and/or total inductance of the primary windings, Lp, is considered as an alternative when power is transferred from the primary to the secondary);

ω is the switching frequency expressed in radians.

In alternate embodiments, the electronic controller, the electronic data processor, the deadtime compensation module or the hysteresis module may use additional equations to estimate the compensating phase shift ($\phi$), which depends upon the corresponding current error or difference between the observed output current and the target output current (e.g., based on the commanded output current):

$$P = \dfrac{nV_{in}V_{out}\phi(4\pi - 3\phi)}{6\pi\omega L_s}, \; 0 < \phi \leq \dfrac{\pi}{3}$$

$$P = \dfrac{nV_{in}V_{out}(18\pi\phi - 18\phi^2 - \pi^2)}{18\pi\omega L_s}, \; \dfrac{\pi}{3} < \phi \leq \dfrac{2\pi}{3}$$

$$\begin{cases} I_{DAB} = \dfrac{nV_{in}\phi(4\pi - 3\phi)}{6\pi\omega L_s}, & 0 < \phi \leq \dfrac{\pi}{3} \\ I_{DAB} = \dfrac{nV_{in}(18\pi\phi - 18\phi^2 - \pi^2)}{18\pi\omega L_s}, & \dfrac{\pi}{3} < \phi \leq \dfrac{2\pi}{3} \end{cases}$$

where $I_{DAB}$ is the current output (e.g., in Amps) of the DC-to-DC converter through the load (e.g., coupled to secondary DC output terminals);

P is the power output (e.g., in Watts) of the DC-DC converter at the load (e.g., coupled to secondary DC output terminals);

$V_{in}$ is the input voltage (e.g., in volts) of the DC-to-DC converter or to the primary converter of the DC-to-DC converter, $V_{out}$ is the output voltage (e.g., in volts) of the DC-to-DC converter or from the second converter of the DC-to-DC converter;

n is a turn ratio between the primary and secondary windings of the transformer, $L_s$ is the inductance (e.g., in Henries) of the secondary windings (e.g., although usually the leakage inductance and/or total inductance of the primary windings, $L_p$, is considered as an alternative when power is transferred from the primary to the secondary);

ω is the switching frequency expressed in radians.

The deadtime effect of the dual-active bridge DC-to-DC converter ("DAB converter") depends on the ZVS behavior on both the primary converter (e.g., input bridge) and the secondary converter (e.g., output bridge). The deadtime in the switches of the primary converter and the secondary converter can result in a first mismatch between the ideal phase-shift angle and actual phase-shift angle, and a second mismatch between the command current and the actual output current. The system and method of this disclosure is well suited for addressing compensating of the first mismatch by a compensating phase shift and the second mismatch by a compensating command current that adjusts the commanded current outputted to the load at the secondary converter or output bridge at the output terminals.

For parallel DAB converters, one or more mismatched phase-shift angles may lead to the asymmetrical performance between two DAB converters, such as oscillation of the power output or current output into a load during the transient. For a single DAB converter, the deadtime can be vulnerable to deterioration of the voltage tracking performance, and maintenance of the fixed DC voltage at the output terminals to the load, because of the sudden change of the disturbance that is introduced by the deadtime.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A dual-active-bridge converter comprising:
a primary converter having a first switched terminal of low-side semiconductor switch coupled to a corresponding second switched terminal of high-side semiconductor switch at a primary alternating current node, the low-side semiconductor switch having a second switched terminal coupled to one terminal of a primary direct current bus; the high-side semiconductor switch having a first switched terminal coupled to another terminal of the primary direct current bus;
a secondary converter having a first switched terminal of low-side semiconductor switch coupled to a corresponding second switched terminal of high-side semiconductor switch at a secondary alternating current node, the low-side semiconductor switch having a second switched terminal coupled to one terminal of a secondary direct current bus; the high-side semiconductor switch having a first switched terminal coupled to another terminal of the secondary direct current bus;
an output voltage estimator configured to estimate an observed output voltage the secondary converter;
an output current estimator configured to estimate an observed output current of the secondary converter;
a transformer coupled between the primary current node and the secondary current node;
an electronic controller configured to provide control signals to the control terminals of the semiconductor switches of the primary converter and the secondary converter based on a commanded current or target output current; the electronic controller configured to adjust the phase angle(s), between a respective pairs of semiconductor switches of the primary converter and second converter based on a deadtime compensation module responsive to a current error or current difference between the target output current and the observed output current.

2. The converter according to claim 1 wherein the bandwidth of the deadtime compensation is greater than a bandwidth of a voltage regulation loop of the secondary DC bus output.

3. The converter according to claim 1 wherein a feedforward component of the target output current is susceptible to current oscillation of the load current.

4. The method according to claim 1 wherein the bandwidth of the deadtime compensation is greater than a bandwidth of a voltage regulation loop of the secondary DC bus output.

5. The method according to claim 1 wherein a feedforward component of the target output current is susceptible to current oscillation of the load current.

6. The converter according to claim 1 wherein the current error is a function of a low-pass filter bandwidth, its cut-off frequency or its Q (quality) ratio that enables the current error to be estimated within a limited bandwidth or potentially resonant frequency of the low-pass filter.

7. The converter according to claim 6 such that within a certain bandwidth the current error can be estimated based on the following equation:

$$f_{DT} = C\frac{dU_{DAB}}{dt} + I_{DAB} - I_{cmd}$$

where $f_{DT}$ is the current error between the ideal output current and the actual output current that is influenced or disturbed by deadtime;

where C is the capacitance of a secondary capacitor between secondary DC output terminals;

$u_{DAB}$ is the voltage or voltage potential between the terminals of the capacitor C;

$dU_{DAB/dt}$ is the derivative of the observed output voltage between the terminals of the capacitor C, where the derivative measures an alternating current component or transient of predominately direct current output at the secondary DC output terminals;

$I_{DAB}$ is the observed output current or observed load current at the secondary DC output terminals;

$I_{cmd}$ is the commanded output current at the secondary DC output terminals.

8. The converter according to claim 7 wherein the deadtime compensation module is configured to generate a phase shift between corresponding semiconductor switches of the primary converter and the secondary converter to compensate for the error or difference associated with the deadtime with attenuated components in the error arising from sensor noise of the current estimator, the voltage estimator, or both.

9. The converter according to claim 8 wherein the deadtime compensation module is configured to adjust a phase offset between a low-side switch and a high-side switch of the primary converter or the secondary converter consistent with a target duty cycle.

10. The converter according to claim 7 wherein the deadtime compensation module is configured to apply an adaptive hysteresis loop to reduce the error over one or more successive measurement intervals of the sensors.

11. The converter according to claim 10 wherein a maximum compensating phase shift of adaptive hysteresis loop is bounded by or proportional to the switching frequency and the deadtime duration in the primary converter or secondary converter.

12. The converter according to claim 11 wherein the adaptive hysteresis loop is based on the operating point of the converter, such as dual-active-bridge (DAB) converter power equations.

13. The converter according to claim 7 wherein the deadtime compensation module is configured to adjust the phase shift based on the error consistent with maintaining a zero-voltage-switching (ZVS) state within the primary and secondary switches of the converter.

14. A method of operating a dual-active-bridge (DAB) direct-current-to-direct current converter, the method comprising:
estimating an observed output voltage of the secondary converter;
estimating an observed output current of the secondary converter;
providing control signals to a plurality of control terminals of the semiconductor switches of the primary converter and the secondary converter based on a commanded current or target output current; and
adjusting one or more phase angles between respective pairs of semiconductor switches of the primary converter and the secondary converter based on a deadtime compensation responsive to a current error or current difference between the target output current and the observed output current.

15. The method according to claim 14 further comprising:
adjusting a phase offset between a low-side switch and a high-side switch of the primary converter or the secondary converter consistent with a target duty cycle.

16. The method according to claim 14 wherein the current error is a function of a low-pass filter bandwidth or its cut-off frequency, or its Q (quality) ratio that enables the current error to be estimated within a limited bandwidth or about a potentially resonant frequency of the low-pass filter.

17. The method according to claim 16, within a certain bandwidth, defined by the Q ratio, estimating the current error based on the following equation:

$$f_{DT} = C\frac{dU_{DAB}}{dt} + I_{DAB} - I_{cmd}$$

where C is the secondary capacitor between secondary DC output terminals;

$dU_{DAB/dt}$ is the derivative of the observed output voltage with respect to time, which measures an alternating current component or transient of predominately direct current output at the secondary DC output terminals;

$I_{DAB}$ is the observed output current or observed load current at the secondary DC output terminals;

$I_{cmd}$ is the commanded output current at the secondary DC output terminals.

18. The method according to claim 14 further comprising:
generating a phase shift between corresponding semiconductor switches of the primary converter and the secondary converter to compensate for the error or difference associated with the deadtime with attenuated components in the error arising from sensor noise of the current estimator, the voltage estimator, or both.

19. The method according to claim 18 further comprising:
applying an adaptive hysteresis loop to reduce the error over one or more successive measurement intervals of any sensors or estimators for estimating the output current and output voltage of the secondary converter.

20. The method according to claim 19 wherein a maximum compensating phase shift of adaptive hysteresis loop is bounded by or proportional to the switching frequency and the deadtime duration in the primary converter or secondary converter.

21. The method according to claim 19 wherein the adaptive hysteresis loop is based on the operating point of DAB converter, such as dual-active-bridge (DAB) converter power equations.

22. The method according to claim 14 further comprising:
adjusting the phase shift based on the error consistent with maintaining a zero-voltage-switching (ZVS) state within the primary and secondary switches of The method.

* * * * *